(12) United States Patent
Nelken et al.

(10) Patent No.: US 7,644,057 B2
(45) Date of Patent: Jan. 5, 2010

(54) SYSTEM AND METHOD FOR ELECTRONIC COMMUNICATION MANAGEMENT

(75) Inventors: Yoram Nelken, San Francisco, CA (US);
Nissan Hajaj, San Francisco, CA (US);
Josemina Magdalen, Jerusalem (IL);
Dani Cohen, Jerusalem (IL)

(73) Assignee: International Business Machines Corporation, Armonk, NY (US)

( * ) Notice: Subject to any disclaimer, the term of this patent is extended or adjusted under 35 U.S.C. 154(b) by 603 days.

(21) Appl. No.: 10/839,829

(22) Filed: May 5, 2004

(65) Prior Publication Data

US 2004/0254904 A1 Dec. 16, 2004

Related U.S. Application Data

(63) Continuation-in-part of application No. 09/754,179, filed on Jan. 3, 2001, now Pat. No. 7,099,855.

(60) Provisional application No. 60/468,492, filed on May 6, 2003.

(51) Int. Cl.
*G06F 17/00* (2006.01)
(52) U.S. Cl. .................. 706/55; 706/12; 706/20; 706/45; 706/46; 707/1; 707/3; 704/9; 704/255
(58) Field of Classification Search .................. 706/10, 706/12–21, 45–48, 50, 61, 909; 709/202, 709/206; 707/1, 3, 10; 704/9, 236, 255
See application file for complete search history.

(56) References Cited

U.S. PATENT DOCUMENTS

| | | | |
|---|---|---|---|
| 3,648,253 A | 3/1972 | Mullery et al. | |
| 4,110,823 A | 8/1978 | Cronshaw et al. | |
| 4,286,322 A | 8/1981 | Hoffman et al. | |
| 4,586,160 A | 4/1986 | Amano et al. | |
| 4,642,756 A | 2/1987 | Sherrod | |

(Continued)

FOREIGN PATENT DOCUMENTS

CA 2180392 2/2001

(Continued)

OTHER PUBLICATIONS

U.S. Appl. No. 10/839,930, filed Aug. 25, 2005, Nelken et al.

(Continued)

*Primary Examiner*—David R Vincent
*Assistant Examiner*—Omar F Fernandez Rivas
(74) *Attorney, Agent, or Firm*—Gates & Cooper LLP

(57) ABSTRACT

A system and method for classifying text includes a pre-processor, a knowledge base, and a statistical engine. The pre-processor identifies concepts in the text and creates a structured text object that contains the concepts. The structured text object is then passed to a statistical engine, which applies statistical information provided in nodes of a knowledge base to the structured text object in order to calculate a set of match scores, each match score representing the relevance of the text to an associated one of a plurality of predefined categories. The pre-processor may be implemented in the form of an interpreter which selects and executes a script that includes language- and scenario-specific instructions for performing linguistic and semantic analysis of the text.

24 Claims, 7 Drawing Sheets

U.S. PATENT DOCUMENTS

| | | | |
|---|---|---|---|
| 4,658,370 A * | 4/1987 | Erman et al. ................... 706/60 |
| 4,724,523 A | 2/1988 | Kucera |
| 4,805,107 A | 2/1989 | Kieckhafer et al. |
| 4,814,974 A | 3/1989 | Narayanan et al. |
| 4,815,005 A * | 3/1989 | Oyanagi et al. ............... 706/55 |
| 4,817,027 A | 3/1989 | Plum et al. |
| 4,908,865 A | 3/1990 | Doddington et al. |
| 4,918,735 A | 4/1990 | Morito et al. |
| 4,942,527 A | 7/1990 | Schumacher |
| 4,984,178 A | 1/1991 | Hemphill et al. |
| 5,018,215 A | 5/1991 | Nasr et al. |
| 5,023,832 A | 6/1991 | Fulcher et al. |
| 5,040,141 A | 8/1991 | Yazima et al. |
| 5,051,924 A | 9/1991 | Bergeron et al. |
| 5,060,155 A | 10/1991 | Van Zuijlen |
| 5,067,099 A | 11/1991 | McCown et al. |
| 5,068,789 A | 11/1991 | van Vliembergen |
| 5,099,425 A | 3/1992 | Kanno et al. |
| 5,101,349 A | 3/1992 | Tokuume et al. |
| 5,111,398 A | 5/1992 | Nunberg et al. |
| 5,210,872 A | 5/1993 | Ferguson et al. |
| 5,228,116 A | 7/1993 | Harris et al. |
| 5,230,054 A | 7/1993 | Tamura |
| 5,247,677 A | 9/1993 | Welland et al. |
| 5,251,129 A | 10/1993 | Jacobs |
| 5,251,131 A | 10/1993 | Masand et al. |
| 5,265,033 A | 11/1993 | Vajk et al. |
| 5,278,942 A | 1/1994 | Bahl et al. |
| 5,287,430 A | 2/1994 | Iwamoto |
| 5,311,583 A | 5/1994 | Friedes et al. |
| 5,321,608 A | 6/1994 | Namba et al. |
| 5,323,310 A * | 6/1994 | Robinson ....................... 704/2 |
| 5,325,298 A | 6/1994 | Gallant |
| 5,325,526 A | 6/1994 | Cameron et al. |
| 5,345,501 A | 9/1994 | Shelton |
| 5,349,526 A | 9/1994 | Potts et al. |
| 5,365,430 A | 11/1994 | Jagadish |
| 5,369,570 A | 11/1994 | Parad |
| 5,369,577 A | 11/1994 | Kadashevich et al. |
| 5,371,807 A | 12/1994 | Register et al. |
| 5,377,354 A | 12/1994 | Scannell et al. |
| 5,418,717 A | 5/1995 | Su et al. |
| 5,418,948 A | 5/1995 | Turtle |
| 5,437,032 A | 7/1995 | Wolf et al. |
| 5,475,588 A | 12/1995 | Schabes et al. |
| 5,483,466 A | 1/1996 | Kawahara et al. |
| 5,487,100 A | 1/1996 | Kane |
| 5,493,677 A | 2/1996 | Balogh et al. |
| 5,493,692 A | 2/1996 | Theimer et al. |
| 5,506,787 A | 4/1996 | Muhlfeld et al. |
| 5,522,026 A | 5/1996 | Records et al. |
| 5,526,521 A | 6/1996 | Fitch et al. |
| 5,528,701 A * | 6/1996 | Aref ............................ 382/178 |
| 5,542,088 A | 7/1996 | Jennings, Jr. et al. |
| 5,555,344 A | 9/1996 | Zunkler |
| 5,559,710 A | 9/1996 | Shahraray et al. |
| 5,566,171 A | 10/1996 | Levinson |
| 5,574,933 A | 11/1996 | Horst |
| 5,577,241 A | 11/1996 | Spencer |
| 5,590,055 A | 12/1996 | Chapman et al. |
| 5,594,641 A | 1/1997 | Kaplan et al. |
| 5,596,502 A | 1/1997 | Koski et al. |
| 5,610,812 A | 3/1997 | Schabes et al. |
| 5,615,360 A | 3/1997 | Bezek et al. |
| 5,627,914 A | 5/1997 | Pagallo |
| 5,630,128 A | 5/1997 | Farrell et al. |
| 5,634,053 A | 5/1997 | Noble et al. |
| 5,634,121 A | 5/1997 | Tracz et al. |
| 5,636,124 A | 6/1997 | Rischar et al. |
| 5,649,215 A | 7/1997 | Itoh |
| 5,664,061 A | 9/1997 | Andreshak et al. |
| 5,680,511 A * | 10/1997 | Baker et al. ................... 704/257 |
| 5,680,628 A | 10/1997 | Carus |
| 5,687,384 A | 11/1997 | Nagase |
| 5,689,620 A * | 11/1997 | Kopec et al. ................... 706/12 |
| 5,694,616 A | 12/1997 | Johnson et al. |
| 5,701,400 A | 12/1997 | Amado |
| 5,708,829 A | 1/1998 | Kadashevich |
| 5,721,770 A | 2/1998 | Kohler |
| 5,721,897 A | 2/1998 | Rubinstein |
| 5,724,481 A | 3/1998 | Garberg et al. |
| 5,737,621 A | 4/1998 | Kaplan et al. |
| 5,737,734 A | 4/1998 | Schultz |
| 5,745,652 A | 4/1998 | Bigus |
| 5,745,736 A | 4/1998 | Picart |
| 5,745,893 A * | 4/1998 | Hill et al. ........................ 707/5 |
| 5,748,973 A | 5/1998 | Palmer et al. |
| 5,754,671 A | 5/1998 | Higgins et al. |
| 5,761,631 A | 6/1998 | Nasukawa |
| 5,765,033 A | 6/1998 | Miloslavsky |
| 5,768,578 A | 6/1998 | Kirk et al. |
| 5,794,194 A | 8/1998 | Takebayashi et al. |
| 5,799,268 A | 8/1998 | Boguraev |
| 5,809,462 A | 9/1998 | Nussbaum |
| 5,809,464 A | 9/1998 | Kopp et al. |
| 5,811,706 A | 9/1998 | Van Buskirk et al. |
| 5,822,731 A | 10/1998 | Schultz |
| 5,822,745 A | 10/1998 | Hekmatpour |
| 5,826,076 A | 10/1998 | Bradley et al. |
| 5,832,220 A | 11/1998 | Johnson et al. |
| 5,835,682 A | 11/1998 | Broomhead et al. |
| 5,839,106 A * | 11/1998 | Bellegarda ................... 704/257 |
| 5,845,246 A | 12/1998 | Schalk |
| 5,850,219 A | 12/1998 | Kumomura |
| 5,860,059 A | 1/1999 | Aust et al. |
| 5,864,848 A | 1/1999 | Horvitz et al. |
| 5,864,863 A | 1/1999 | Burrows |
| 5,867,495 A | 2/1999 | Elliott et al. |
| 5,867,799 A * | 2/1999 | Lang et al. ....................... 707/1 |
| 5,878,385 A | 3/1999 | Bralich et al. |
| 5,878,386 A | 3/1999 | Coughlin |
| 5,884,032 A | 3/1999 | Bateman et al. |
| 5,884,302 A | 3/1999 | Ho |
| 5,890,142 A | 3/1999 | Tanimura et al. |
| 5,890,147 A | 3/1999 | Peltonen et al. |
| 5,895,447 A | 4/1999 | Ittycheriah et al. |
| 5,899,971 A | 5/1999 | De Vos |
| 5,913,215 A | 6/1999 | Rubinstein et al. |
| 5,920,835 A | 7/1999 | Huzenlaub et al. |
| 5,933,822 A | 8/1999 | Braden-Harder et al. |
| 5,937,400 A * | 8/1999 | Au ................................ 706/55 |
| 5,940,612 A | 8/1999 | Brady et al. |
| 5,940,821 A | 8/1999 | Wical |
| 5,944,778 A | 8/1999 | Takeuchi et al. |
| 5,948,058 A | 9/1999 | Kudoh et al. |
| 5,950,184 A | 9/1999 | Karttunen |
| 5,950,192 A | 9/1999 | Moore et al. |
| 5,956,711 A | 9/1999 | Sullivan et al. |
| 5,960,393 A | 9/1999 | Cohrs et al. |
| 5,963,447 A | 10/1999 | Kohn et al. |
| 5,963,894 A | 10/1999 | Richardson et al. |
| 5,970,449 A | 10/1999 | Alleva et al. |
| 5,974,385 A | 10/1999 | Ponting et al. |
| 5,974,465 A | 10/1999 | Wong |
| 5,983,216 A | 11/1999 | Kirsch |
| 5,987,446 A * | 11/1999 | Corey et al. ..................... 707/3 |
| 5,991,713 A | 11/1999 | Unger et al. |
| 5,991,751 A | 11/1999 | Rivette et al. |
| 5,991,756 A | 11/1999 | Wu |
| 5,995,513 A | 11/1999 | Harrand et al. |
| 5,999,932 A | 12/1999 | Paul |
| 5,999,990 A | 12/1999 | Sharrit et al. |
| 6,006,221 A * | 12/1999 | Liddy et al. ..................... 707/5 |
| 6,009,422 A | 12/1999 | Ciccarelli |

| | | | |
|---|---|---|---|
| 6,012,053 A | 1/2000 | Pant et al. | |
| 6,018,735 A | 1/2000 | Hunter | |
| 6,021,403 A | 2/2000 | Horvitz et al. | |
| 6,025,843 A | 2/2000 | Sklar | |
| 6,026,388 A | 2/2000 | Liddy et al. | |
| 6,032,111 A | 2/2000 | Mohri et al. | |
| 6,035,104 A | 3/2000 | Zahariev | |
| 6,038,535 A | 3/2000 | Campbell | |
| 6,038,560 A | 3/2000 | Wical | |
| 6,055,528 A | 4/2000 | Evans | |
| 6,058,365 A | 5/2000 | Nagal et al. | |
| 6,058,389 A | 5/2000 | Chandra et al. | |
| 6,061,667 A | 5/2000 | Danford-Klein et al. | |
| 6,061,709 A | 5/2000 | Bronte | |
| 6,064,953 A | 5/2000 | Maxwell, III et al. | |
| 6,064,971 A | 5/2000 | Hartnett | |
| 6,067,565 A | 5/2000 | Horvitz | |
| 6,070,149 A | 5/2000 | Tavor et al. | |
| 6,070,158 A | 5/2000 | Kirsch et al. | |
| 6,073,098 A | 6/2000 | Buchsbaum et al. | |
| 6,073,101 A | 6/2000 | Maes | |
| 6,076,088 A | 6/2000 | Paik et al. | |
| 6,081,774 A | 6/2000 | de Hita et al. | |
| 6,085,159 A | 7/2000 | Ortega et al. | |
| 6,092,042 A | 7/2000 | Iso | |
| 6,092,095 A | 7/2000 | Maytal | |
| 6,094,652 A | 7/2000 | Faisal | |
| 6,098,047 A | 8/2000 | Oku et al. | |
| 6,101,537 A | 8/2000 | Edelstein et al. | |
| 6,112,126 A | 8/2000 | Hales et al. | |
| 6,115,683 A * | 9/2000 | Burstein et al. | 704/1 |
| 6,115,734 A | 9/2000 | Mansion | |
| 6,138,128 A | 10/2000 | Perkowitz et al. | |
| 6,138,139 A * | 10/2000 | Beck et al. | 709/202 |
| 6,144,940 A | 11/2000 | Nishi et al. | |
| 6,148,322 A | 11/2000 | Sand et al. | |
| 6,151,538 A | 11/2000 | Bate et al. | |
| 6,154,720 A | 11/2000 | Onishi et al. | |
| 6,161,094 A | 12/2000 | Adcock et al. | |
| 6,161,130 A | 12/2000 | Horvitz et al. | |
| 6,163,767 A | 12/2000 | Tang et al. | |
| 6,167,370 A | 12/2000 | Tsourikov et al. | |
| 6,169,986 B1 | 1/2001 | Bowman et al. | |
| 6,182,029 B1 | 1/2001 | Friedman | |
| 6,182,036 B1 | 1/2001 | Poppert | |
| 6,182,059 B1 | 1/2001 | Angotti et al. | |
| 6,182,063 B1 | 1/2001 | Woods | |
| 6,182,065 B1 | 1/2001 | Yeomans | |
| 6,182,120 B1 | 1/2001 | Beaulieu et al. | |
| 6,185,603 B1 | 2/2001 | Henderson et al. | |
| 6,199,103 B1 | 3/2001 | Sakaguchi et al. | |
| 6,203,495 B1 | 3/2001 | Bardy | |
| 6,212,544 B1 | 4/2001 | Borkenhagen et al. | |
| 6,223,201 B1 | 4/2001 | Reznak | |
| 6,226,630 B1 | 5/2001 | Billmers | |
| 6,233,575 B1 * | 5/2001 | Agrawal et al. | 707/6 |
| 6,233,578 B1 | 5/2001 | Machihara et al. | |
| 6,236,987 B1 | 5/2001 | Horowitz et al. | |
| 6,243,679 B1 | 6/2001 | Mohri et al. | |
| 6,243,735 B1 | 6/2001 | Imanishi et al. | |
| 6,249,606 B1 | 6/2001 | Kiraly et al. | |
| 6,253,188 B1 | 6/2001 | Witek et al. | |
| 6,256,631 B1 | 7/2001 | Malcolm | |
| 6,256,773 B1 | 7/2001 | Bowman-Amuah | |
| 6,260,058 B1 | 7/2001 | Hoenninger et al. | |
| 6,263,335 B1 | 7/2001 | Paik et al. | |
| 6,269,368 B1 | 7/2001 | Diamond | |
| 6,271,840 B1 | 8/2001 | Finseth et al. | |
| 6,275,819 B1 | 8/2001 | Carter | |
| 6,278,973 B1 | 8/2001 | Chung et al. | |
| 6,282,565 B1 | 8/2001 | Shaw et al. | |
| 6,292,794 B1 | 9/2001 | Cecchini et al. | |
| 6,292,938 B1 | 9/2001 | Sarkar et al. | |
| 6,298,324 B1 | 10/2001 | Zuberec et al. | |
| 6,301,602 B1 | 10/2001 | Ueki | |
| 6,304,864 B1 | 10/2001 | Liddy et al. | |
| 6,304,872 B1 | 10/2001 | Chao | |
| 6,308,197 B1 | 10/2001 | Mason et al. | |
| 6,311,194 B1 | 10/2001 | Sheth et al. | |
| 6,314,439 B1 | 11/2001 | Bates et al. | |
| 6,314,446 B1 | 11/2001 | Stiles | |
| 6,324,534 B1 | 11/2001 | Neal et al. | |
| 6,327,581 B1 | 12/2001 | Platt | |
| 6,879,586 B2 | 1/2002 | Miloslavsky et al. | |
| 6,349,295 B1 | 2/2002 | Tedesco et al. | |
| 6,353,667 B1 | 3/2002 | Foster et al. | |
| 6,353,827 B1 | 3/2002 | Davies et al. | |
| 6,360,243 B1 | 3/2002 | Lindsley et al. | |
| 6,363,373 B1 | 3/2002 | Steinkraus | |
| 6,363,377 B1 | 3/2002 | Kravets et al. | |
| 6,366,910 B1 | 4/2002 | Rajaraman et al. | |
| 6,370,526 B1 | 4/2002 | Agrawal et al. | |
| 6,374,221 B1 | 4/2002 | Haimi-Cohen | |
| 6,377,945 B1 | 4/2002 | Risvik | |
| 6,377,949 B1 | 4/2002 | Gilmour | |
| 6,389,405 B1 | 5/2002 | Oatman et al. | |
| 6,393,415 B1 | 5/2002 | Getchius et al. | |
| 6,397,209 B1 | 5/2002 | Reed et al. | |
| 6,397,212 B1 | 5/2002 | Biffar | |
| 6,401,084 B1 | 6/2002 | Ortega et al. | |
| 6,405,200 B1 * | 6/2002 | Heckerman | 707/6 |
| 6,408,277 B1 | 6/2002 | Nelken | |
| 6,411,947 B1 | 6/2002 | Rice et al. | |
| 6,411,982 B2 | 6/2002 | Williams | |
| 6,415,250 B1 | 7/2002 | van den Akker | |
| 6,418,458 B1 | 7/2002 | Maresco | |
| 6,421,066 B1 | 7/2002 | Sivan | |
| 6,421,675 B1 | 7/2002 | Ryan et al. | |
| 6,424,995 B1 | 7/2002 | Shuman | |
| 6,424,997 B1 | 7/2002 | Buskirk, Jr. et al. | |
| 6,430,615 B1 | 8/2002 | Hellerstein et al. | |
| 6,434,435 B1 | 8/2002 | Tubel et al. | |
| 6,434,554 B1 | 8/2002 | Asami et al. | |
| 6,434,556 B1 | 8/2002 | Levin et al. | |
| 6,438,540 B2 | 8/2002 | Nasr et al. | |
| 6,438,575 B1 | 8/2002 | Khan et al. | |
| 6,442,542 B1 | 8/2002 | Ramani et al. | |
| 6,442,589 B1 | 8/2002 | Takahashi et al. | |
| 6,446,061 B1 | 9/2002 | Doerre et al. | |
| 6,446,081 B1 | 9/2002 | Preston | |
| 6,446,256 B1 | 9/2002 | Hyman et al. | |
| 6,449,589 B1 | 9/2002 | Moore | |
| 6,449,646 B1 | 9/2002 | Sikora et al. | |
| 6,460,074 B1 | 10/2002 | Fishkin | |
| 6,463,533 B1 | 10/2002 | Calamera et al. | |
| 6,466,940 B1 | 10/2002 | Mills | |
| 6,477,500 B2 | 11/2002 | Maes | |
| 6,477,580 B1 | 11/2002 | Bowman-Amuah | |
| 6,480,843 B2 | 11/2002 | Li | |
| 6,490,572 B2 | 12/2002 | Akkiraju et al. | |
| 6,493,447 B1 | 12/2002 | Goss et al. | |
| 6,493,694 B1 | 12/2002 | Xu et al. | |
| 6,496,836 B1 | 12/2002 | Ronchi | |
| 6,496,853 B1 | 12/2002 | Klein | |
| 6,505,158 B1 | 1/2003 | Conkie | |
| 6,507,872 B1 | 1/2003 | Geshwind | |
| 6,513,026 B1 | 1/2003 | Horvitz et al. | |
| 6,535,795 B1 | 3/2003 | Schroeder et al. | |
| 6,542,889 B1 | 4/2003 | Aggarwal et al. | |
| 6,560,330 B2 | 5/2003 | Gabriel | |
| 6,560,590 B1 | 5/2003 | Shwe et al. | |
| 6,571,282 B1 | 5/2003 | Bowman-Amuah | |
| 6,584,464 B1 | 6/2003 | Warthen | |
| 6,594,697 B1 | 7/2003 | Praitis et al. | |
| 6,601,026 B2 | 7/2003 | Appelt et al. | |
| 6,611,535 B2 | 8/2003 | Ljungqvist | |

| | | | |
|---|---|---|---|
| 6,611,825 B1 * | 8/2003 | Billheimer et al. | 706/45 |
| 6,615,172 B1 | 9/2003 | Bennett et al. | |
| 6,618,727 B1 | 9/2003 | Wheeler et al. | |
| 6,651,220 B1 | 11/2003 | Penteroudakis et al. | |
| 6,654,726 B1 | 11/2003 | Hanzek | |
| 6,654,815 B1 | 11/2003 | Goss et al. | |
| 6,665,662 B1 | 12/2003 | Kirkwood et al. | |
| 6,675,159 B1 * | 1/2004 | Lin et al. | 707/3 |
| 6,704,728 B1 | 3/2004 | Chang et al. | |
| 6,711,561 B1 | 3/2004 | Chang et al. | |
| 6,714,643 B1 | 3/2004 | Gargeya et al. | |
| 6,714,905 B1 | 3/2004 | Chang et al. | |
| 6,738,759 B1 | 5/2004 | Wheeler et al. | |
| 6,742,015 B1 | 5/2004 | Bowman-Amuah | |
| 6,744,878 B1 | 6/2004 | Komissarchik et al. | |
| 6,745,181 B1 | 6/2004 | Chang et al. | |
| 6,747,970 B1 | 6/2004 | Lamb et al. | |
| 6,748,387 B2 | 6/2004 | Garber et al. | |
| 6,766,320 B1 | 7/2004 | Wang et al. | |
| 6,785,671 B1 | 8/2004 | Bailey et al. | |
| 6,850,513 B1 | 2/2005 | Pelissier | |
| 6,862,710 B1 | 3/2005 | Marchisio | |
| 6,868,065 B1 | 3/2005 | Kloth et al. | |
| 6,915,344 B1 | 7/2005 | Rowe et al. | |
| 6,990,628 B1 * | 1/2006 | Palmer et al. | 715/234 |
| 7,047,242 B1 | 5/2006 | Ponte | |
| 7,131,057 B1 * | 10/2006 | Ferrucci et al. | 715/206 |
| 7,370,020 B1 | 5/2008 | Azvine et al. | |
| 2001/0022558 A1 | 9/2001 | Karr, Jr. et al. | |
| 2001/0027463 A1 | 10/2001 | Kobayashi | |
| 2001/0042090 A1 | 11/2001 | Williams | |
| 2001/0047270 A1 | 11/2001 | Gusick et al. | |
| 2001/0056456 A1 | 12/2001 | Cota-Robles | |
| 2002/0032715 A1 | 3/2002 | Utsumi | |
| 2002/0052907 A1 | 5/2002 | Wakal et al. | |
| 2002/0059161 A1 | 5/2002 | Li | |
| 2002/0065953 A1 | 5/2002 | Alford et al. | |
| 2002/0073129 A1 | 6/2002 | Wang et al. | |
| 2002/0078119 A1 | 6/2002 | Brenner et al. | |
| 2002/0078121 A1 | 6/2002 | Ballantyne | |
| 2002/0078257 A1 | 6/2002 | Nishimura | |
| 2002/0083251 A1 | 6/2002 | Chauvel et al. | |
| 2002/0087618 A1 | 7/2002 | Bohm et al. | |
| 2002/0087623 A1 | 7/2002 | Eatough | |
| 2002/0091746 A1 | 7/2002 | Umberger et al. | |
| 2002/0099714 A1 | 7/2002 | Murray | |
| 2002/0103871 A1 | 8/2002 | Pustejovsky | |
| 2002/0107926 A1 | 8/2002 | Lee | |
| 2002/0116463 A1 | 8/2002 | Hart | |
| 2002/0150966 A1 | 10/2002 | Muraca | |
| 2002/0196911 A1 | 12/2002 | Gao et al. | |
| 2003/0028564 A1 | 2/2003 | Sanfilippo | |
| 2003/0046297 A1 | 3/2003 | Mason | |
| 2003/0110181 A1 * | 6/2003 | Schuetze et al. | 707/103 R |

FOREIGN PATENT DOCUMENTS

| | | |
|---|---|---|
| EP | 0 597 630 | 5/1994 |
| EP | 0 304 191 | 2/1999 |
| JP | 09106296 | 4/1997 |
| WO | WO 00/36487 | 6/2000 |
| WO | 01/84373 | 8/2001 |
| WO | 01/84374 | 8/2001 |

OTHER PUBLICATIONS

Breese et al, "Empirical Analysis of Predictive Algorithms for Collaborative Filtering," Proc. of the 14th Conf. on Uncertainty in Artificial Intelligence, Jul. 1998.

Czerwinski et al, "Visualizing Implicit Queries for Information Management and Retrieval," Proc. of CHI 1999; ACM SIGCHI Conf. on Human Factors In Computing Systems, 1999.

Dumais et al., "Inductive Learning Algorithms and Representations for Task Categorization," Proc. of 7th Intl. Conf. on Information & Knowledge Management, 1998.

Horvitz, "Principles of Mixed-Initiative User Interfaces," Proc. of CHI 1999; ACM SIGCHI Conf. on Human Factors in Computing Systems, 1999.

Horvitz et al., "Display of Information for Time-Critical Decision Making," Proc. of the 11th Conf. on Uncertainty in Artificial Intelligence, Jul. 1995.

Horvitz et al., "The Lumiere Project: Bayesian User Modeling . . . ," Proc. of the 14th Conf. on Uncertainty in Artificial Intelligence, Jul. 1998.

Horvitz et al., "Time-Dependent Utility and Action Under Uncertainty," Proc. of the 7th Conf. on Uncertainty in Artificial Intelligence. Jul. 1991.

Horvitz et al., "Time-Critical Action: Representations and Application," Proc. of the 13th Conf. on Uncertainty in Artificial Intelligence, Jul. 1997.

Koller et al., "Toward Optimal Feature Selection," Proc. of 13th Conf. on Machine Learning, 1996.

Lieberman, "Letizia: An Agent That Assists in Web Browsing," Proc. of International Joint Conference on Artificial Intelligence, 1995.

Platt, "Fast Training of Support Vector Machines Using Sequential Minimal Optimization," Advances in Kernel Methods: Support Vector Learning, MIT Press, Cambridge, MA, 1999.

Platt, "Probabilistic Outputs for Support Vector Machines & Comparisons to Regularized Likelihood Methods," Adv. in Large Margin Classifiers, MIT Press, Cambridge, MA, 1999.

Sahami et al. "A Bayesian Approach to Filtering Junk E-Mail," Amer. Assoc. for Art. Intell. Technical Report WS-98-05, 1998.

Cohen, "Learning Rules that Classify E-Mail," AT&T Laboratories, 1996.

Lewis, "Evaluating and Optimizing Autonomous Text Classification Systems," ACM SIGIR, 1995.

Lewis et al., "Training Algorithms for Linear Text Classifiers," ACM SIGIR, 1996.

Apte et al., "Automated Learning of Decision Rules for Text Categorization," ACM Transactions on Information Systems, vol. 12, No. 3, 1994.

Losee, Jr., "Minimizing Information Overload: The Ranking of Electronic Messages," Journal of Information Science 15, 1989.

Joachimes, "Text Categorization with Support Vector Machines: Learning with Many Relevant Features," Universitat Dortmund, Germany, 1998.

Morelli et al., "Predicting Technical Communication in Product Development Organizations," IEEE Transactions on Engineering Management, vol. 42, Iss. 3, Aug. 1995.

Webster's Third New International Dictionary, G. & C. Merriam Company, 1961, pp. 538, 834, 1460.

Computer Dictionary, Microsoft Press, 1997, Third Edition, p. 192.

Parmentier et al., "Logical Structure Recognition of Scientific Bibliographic References," 4th Int'l Conf. on Document Anlysis & Recognition. vol. 2. 18-20, Aug. 1997.

Kalogeraki et al., "Using Multiple Feedback Loops for Object Profiling , . . . " IEEE Int'l Symposium on Object-Oriented Real-Time Distributed Computing, May 2-5, 1999.

Johnson et al., "Adaptive Model-Based Neural Network Control," IEEE Int'l Conference on Robotics and Automation, May 13-18, 1990.

McKinnon et al., "Data Communications and Management of a Distributed Network of Automated Data Acquisition and Analysis Systems," 1997 IEEE Nuclear Science Symp., Nov. 1997.

Moore et al.., "Web Page Categorization and Feature Selection Using Association Rule and Principal Component Clustering," Proceedings of the 7th Workshop on Information Technologies and Systems, Dec. 1997.

Mase, "Experiments on Automatic Web Page Categorization for IR Systems," Technical Report, Stanford University, 1998.

Berners-Lee et al., "The Semantic Web," Scientific American.com, May 17, 2001.

Brasethvik et al., "A Conceptual Modeling Approach to Semantic Document Retrieval," Proceedings of the 14th International Conference on Advanced Information Systems Engineering, May 27-31, 2002.

"Grammar-like Functional Rules for Representing Query Optimization Alternative," 1998 ACM, pp. 18-27.

Khan et al., "Personal Adaptive Web Agent: A Tool for Information Filtering," Canadian Conference on Electrical and Computer Engineering, vol. 1, May 25, 1997, pp. 305-308.

Davies et al., "Knowledge Discovery and Delivery," British Telecommunications Engineering, London, GB, vol. 17, No. 1, Apr. 1, 1998, pp. 25-35.

Persin, "Document Filtering for Fast Ranking," Sigir 94. Dublin, Jul. 3-6, 1994, Proceedings of the Annual International ACM-Sigir Conference on Research and Development in Information Retrieval, Berlin, Springer, DE, vol. CONF. 17, Jul. 3, 1994, pp. 339-348.

Han et al., "WebACE: A Web Agent for Document Categorization and Exploration," Proceedings of the 2nd International Conference on Autonomous Agents Minneapolis/St. Paul, MN, May 9-13, 1998, Proceedings of the International Conference on Autonomous Agents, New York, NY, May 9, 1998, pp. 408-415.

Shimazu et al., "CAPIT: Natural Language Interface Design Tool with Keyword Analyzer and Case-Based Parser," NEC Research and Development, Nippon Electric Ltd., Tokyo, JP, vol. 33, No. 4, Oct. 1, 1992, pp. 679-688.

searchCRM.com Definitions (contact center), (accessed Jul. 5, 2005).

"Transforming Your Call Center Into a Contact Center: Where Are You? Trends and Recommendations," An IDC Executive Brief (#33), Jun. 2001.

Hawkins et al., "The Evolution of the Call Center to the 'Customer Contact Center'," ITSC White Paper, Feb. 2001.

Webster's Computer Internet Dictionary, 3rd Edition, P.E. Margolis, 1999.

Knesser et al., "Semantic Clustering for Adaptive Language Modeling," IEEE, 1997, 0-8186-7919-0/97, pp. 779.782.

* cited by examiner

US 7,644,057 B2

SYSTEM AND METHOD FOR ELECTRONIC COMMUNICATION MANAGEMENT

CROSS-REFERENCE TO RELATED APPLICATIONS

This application is a continuation in part and claims the priority benefit of U.S. patent application Ser. No. 09/754,179, filed Jan. 3, 2001, and entitled "System and Method for Electronic Communication Management," now U.S. Pat. No. 7,099,855, issued Aug. 29, 2006, and further claims the priority benefit of U.S. provisional patent application Ser. No. 60/468,492, filed May 6, 2003 and entitled "System and Method for Classifying Text." The disclosures of the foregoing applications are incorporated herein by reference. Furthermore, this application is related to patent application Ser. No. 10/839,930, entitled "Web-Based Customer Service Interface," herein incorporated by reference, filed on May 5, 2004.

BACKGROUND OF THE INVENTION

1. Field of the Invention

This invention relates generally to electronic communications and relates more particularly to a system and method for electronic communication management.

2. Description of the Background Art

In a typical organization, communications with customers and others may occur via a variety of different channels. In addition to traditional channels such as letters and telephone calls, customers may also communicate with an organization via electronic mail, facsimile, web-based forms, web-based chat, and wireless communication and voice. An organization will most likely incorporate these and any other newly developed communication channels to allow customers to communicate in a way they find most convenient.

Many of the communication channels mentioned above contain information that is unstructured in nature, usually expressed in natural language. Different customers may make identical requests each in a unique way, using different communication channels, different words and expressions, or both. Human agents are usually required to review each natural language communication to evaluate the customer's intent, and to determine what information or action would be responsive to that intent.

Agents typically must look to various sources to gather all of the information required to respond appropriately to a customer communication. The information may be retrieved from a variety of sources, such as legacy systems, databases, back office systems, and front office systems. Each of these sources may store data in a unique structure or format. An agent typically gathers and organizes the required information from one or more of these information sources and uses the information to compose an appropriate content-rich reply that is responsive to the customer's intent.

Utilizing people to respond to customer communications is often inefficient. In addition, an increase in the number of communications received by an organization typically requires an even greater increase in the number of people required to provide an acceptable level of customer service.

Several types of automatic systems exist for responding to customer communications. Rule-based systems, keyword-based systems, and statistical systems typically do not perform with the necessary accuracy to substantially automate business processes, such as responding to customer inquiries, and require a large investment in resources to keep them up-to-date. Many learning systems utilize a training set of data that is a poor representation of the system's world, which reduces the accuracy of the system and makes the process of updating the system very cumbersome.

SUMMARY OF INVENTION

The invention provides a system and method for electronic communication management. The system comprises a contact center, a modeling engine, an adaptive knowledge base, and a feedback module. The contact center may send and receive communications via various communication channels including phone, facsimile, electronic mail, web forms, chat, and wireless. The modeling engine analyzes received communications to determine an intent. For received communications containing natural language text, the modeling engine performs morphological, semantic, and other analyses. For voice-based communications, the system performs various digital signal processing tasks.

The adaptive knowledge base stores models that are used to predict responses and actions to the received communications based on the intent identified by the modeling engine. The feedback module monitors actual responses to the received communications and compares them to the predicted responses. If a predicted response is substantially the same as the actual response, the model or models that predicted the response are updated with positive feedback. The feedback module supports multiple feedbacks to a single communication. If a predicted response is substantially different than the actual response, the model or models that predicted the response are updated with negative feedback. The feedback process may be performed either in real time or off-line. Each model has an internal accuracy gauge that is updated by the feedback. The system learns from every communication that is processed.

The modeling engine may also support various application specific modules, for example, an automatic response module, an automatic task prioritization module, an expertise based routing module, a content filter, a workflow application module, and a business process automation module. The modeling engine may also retrieve data from various sources, such as databases and back office systems, which relate to the intent of a communication.

The contact center converts each received communication into a universal data model format. The models in the adaptive knowledge base may also be expressed in the universal data model format, so that models of different types of data may be compared to each other.

In accordance with another aspect of the invention, a computerized text classifier system is provided having a modeling engine and an associated knowledge base. The modeling engine is divided into a pre-processor and a statistical engine, which serially process a text in order to compute match scores that may be used to classify the text into a relevant category. The pre-processor may identify concepts in the text by selecting and executing an appropriate script that corresponds to an attribute of the text, such as the language in which it is written or a scenario to which it pertains. The identified concepts are assembled into a structured text object, which is passed to the statistical engine for further processing. The statistical engine computes a set of match scores for the text based on information contained within a knowledge base, which may take the form of a collection of rule-based and/or statistical nodes (at least some of which represent categories) organized into a tree structure. The computed match scores are then passed to an application. In a preferred implementation, the match scores may be calibrated to an operational parameter, such as recall or precision. In another embodiment, the computerized text classifier system uses real-time feedback to modify the information associated with the statistical nodes in the knowledge base.

DETAILED DESCRIPTION

Figure 1:
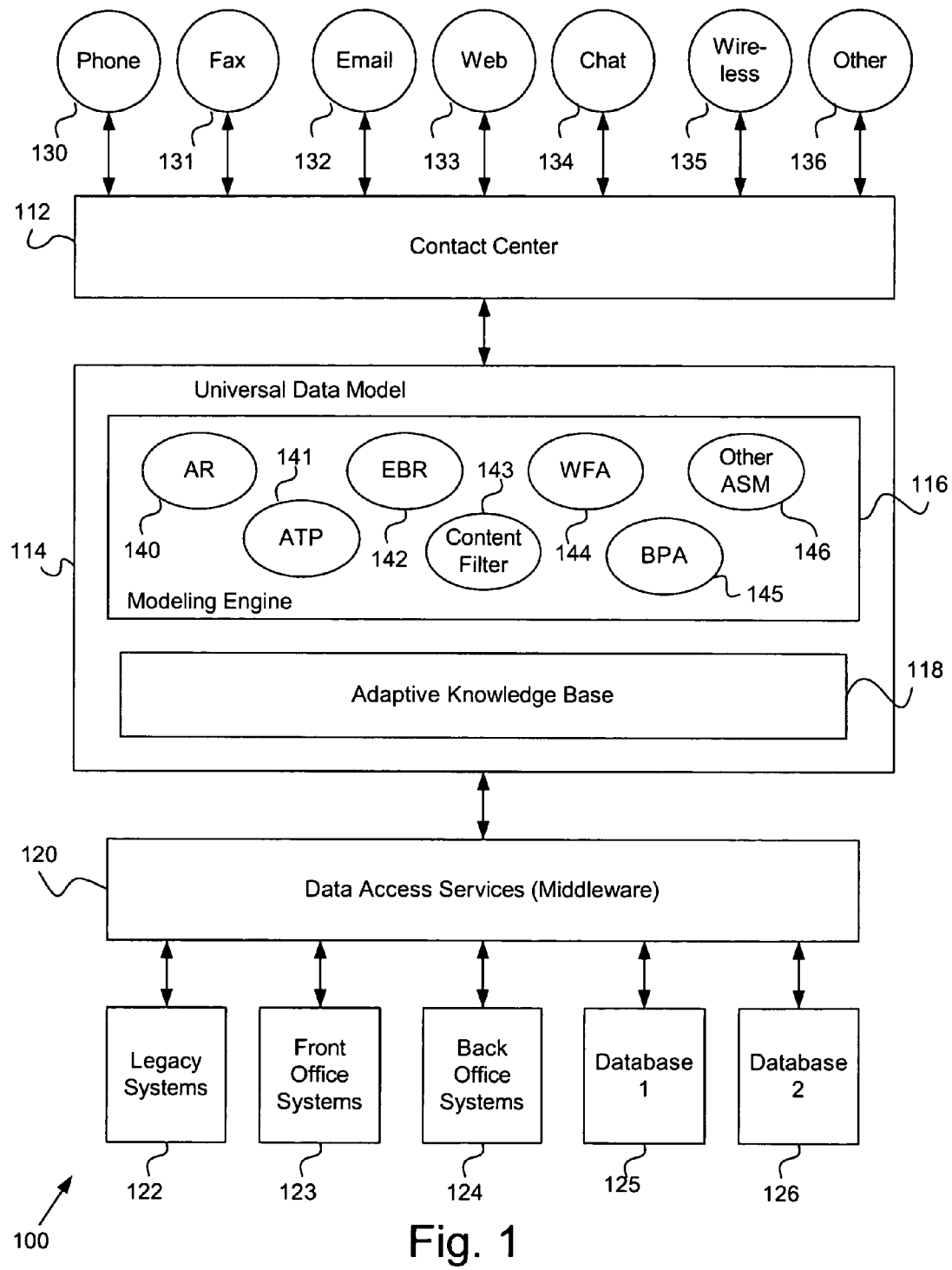
FIG. 1 is a block diagram for one embodiment of an electronic communications system, according to the present invention.

Referring now to FIG. 1, a block diagram of an electronic communication management system 100 is shown. System 100 includes, but is not limited to, a contact center 112, a universal data model 114, a modeling engine 116, an adaptive knowledge base 118, and data access services 120. Contact center 112 receives communications from a variety of channels. The channels include, but are not limited to, telephone 130, facsimile 131, electronic mail (Email) 132, web-based communications 133, chat communications 134, and wireless communications 135. Other types of electronic communications 136, for example a file transfer using the File Transfer Protocol (FTP), are within the scope of the present invention. New communication channels may be added without taking the system off-line.

The communications received by contact center 112 typically contain data or information that is unstructured in nature. With the exception of some web-based or other type of electronic forms, the communications usually contain information expressed in natural language. Each individual correspondent may compose a communication in a unique way, even when requesting the same type of information.

System 100 also includes data access services (middleware) 120 that retrieve data from various sources that include, but are not limited to, legacy systems 122, front office systems 123, back office systems 124, and databases 125, 126. These sources typically contain data that are structured, each source potentially having its own data format. Data access services 120 of the present invention translate the data from each source to conform to a universal data model 114 format, so that data from the various sources may be represented according to a common data structure. For example, a universal data model of front office data will have the same structure as a model of back office data.

Contact center 112 of the present invention translates incoming communications from the various communication channels to conform to universal data model 114, so that data from the various communication channels may be represented according to a common data structure. For example, a universal data model of a facsimile communication will have the same structure as a model of an email communication with any obviously necessary changes. The universal data model 114 of the present invention allows different types of data to be represented in a common data format, regardless of the source or type of data.

Universal data model 114 allows system 100 to analyze, model, and compare models of different types of data. System 100 may create and compare models of email communications, models of database information, and models of human agents. System 100 is able to compare a model of an email communication to a model of an agent, which in turn may be compared to a model of a business process because all models have the same universal structure. The universal data model 114 advantageously allows previously incompatible types of information to be processed by the same system. The Universal data model 114 is a data driven model of information.

In one embodiment of system 100, universal data model 114 includes concepts that are produced in a hierarchical processing scheme. Lower level concepts may be as general as single words from email texts, voice data, or may be as specific as field descriptors from a web-based form. Further processing allows system 100 to infer intents and other higher level concepts from the lower level concepts. Thus, a final representation of information in universal data model 114 is identical for all information sources.

System 100 also includes a modeling engine 116. Modeling engine 116 is a tool that, in conjunction with universal data model 114, allows system 100 to perform a myriad of tasks using data from various sources. Modeling engine 116 supports various application specific modules 140-146. The application specific modules 140-146 perform specialized operations using modeling engine 116 in conjunction with models and information in the universal data format, and are discussed in further detail below.

To be able to support the application specific modules 140-146, modeling engine 116 monitors relationship events and business processes, and looks for semantical and other patterns. Relationship events are any communications between the organization and other external or internal entities. Relationship events may, for example, include an email from a customer, an order placed via a secure web-based ordering system, an email sent from a queue to an agent, a document submitted to a document management system, and an automatic email response sent to a customer.

Modeling engine 116 builds semantical models based on relationship events. Modeling engine 116 continuously updates the models using positive and negative feedback (explicit or implicit) from system 100, and stores the models in an adaptive knowledge base 118. Using the models, modeling engine 116 learns the business processes of the system. The models in adaptive knowledge base 118 have strong predictive powers. Given a relationship event, a model is able to predict which other relationship events are likely to follow. For example, given an inquiry, system 100 can predict what is the most likely business response, such as answer, routing, or data association.

Modeling engine 116 monitors what business processes follow from a relationship event and determines whether these processes match a model's predictions. A response that matches the prediction is positive feedback that increases the model's accuracy rating, and a response that does not match the prediction is negative feedback that decreases the model's accuracy rating. Both positive and negative feedback adapts adaptive knowledge base 118. Feedback in the present invention is further discussed below in conjunction with FIG. 4.

Modeling engine 116 knows when it knows, and knows when it doesn't know, based on measured correlations between confirmed and unconfirmed predictions. Modeling engine 116 analyzes a relationship event and is able to recognize when the relationship event corresponds to a model in adaptive knowledge base 118 and when the event does not correspond to a model, or corresponds to a low-dependability model. When a relationship event does not correspond to a model, modeling engine 116 will typically route the event for handling by an agent, and then create a potential new model based on the event, or use predefined rules.

Since received communications are translated into the universal data format, modeling engine 116 is able to learn from feedback for one communication channel and apply that knowledge to another communication channel. For example, feedback from an agent responding to inquiries received via Email 132 may result in knowledge that allows system 100 to automatically answer inquiries on a chat 134 channel, without reconfiguration of system 100.

Adaptive knowledge base 118 organizes the models into various categories. Logically related categories are associated with a branch, which in turn may be associated with a branch of larger scope. Using similar statistical techniques to the ones described, creation of the hierarchies can be either manual (via a configuration tool or API) or automatic by monitoring feedback. In addition, some branches may be created with associated rules, which allows system 100 to be fine tuned and to detect non-business-compliant agent actions (e.g., submission of a secure communication over an unsecured communication channel).

Adaptive knowledge base 118 may also include flat hierarchies as a special case of tree hierarchies. Other types of graphs, such as a cyclic layered graph, are within the scope of the invention. Incorporating relationship events into the branches of adaptive knowledge base 118 improves the predictive confidence of the branches. As new relationship events are received, new categories are created and new branches develop in adaptive knowledge base 118. The models are used to identify the underlying intent of a relationship event, and to categorize the event based on various criteria, some of which are manual (based on rules) and others which are automatic (based on learning or training). Adaptive knowledge base 118 categorizes events using a meta-language that is able to combine manual and automatic criteria.

Modeling engine 116 creates branches in adaptive knowledge base 118 using a semi-automatic process. At system start-up, the branching process is given information regarding the tasks or applications system 100 is to support, and some general guidelines on how to differentiate between them. The guidelines typically include hard rules combined with intent-based rules.

When system 100 is up and running, Modeling engine 116 uses feedback to modify the branches in adaptive knowledge base 118. Modeling engine 116 collects statistical data for intent-based branches, alerts system 100 when hard rules are violated, and monitors the performance of adaptive knowledge base 118. Modeling engine 116 also suggests structural changes to adaptive knowledge base 118. Modeling engine 116 may join branches that have similar statistical profiles. Modeling engine 116 may split branches into sub-branches using a modified expectation maximization process to increase the overall performance of system 100. Modeling engine 116 may also perform all of the above operations on a flat structure without branches.

Figure 2:
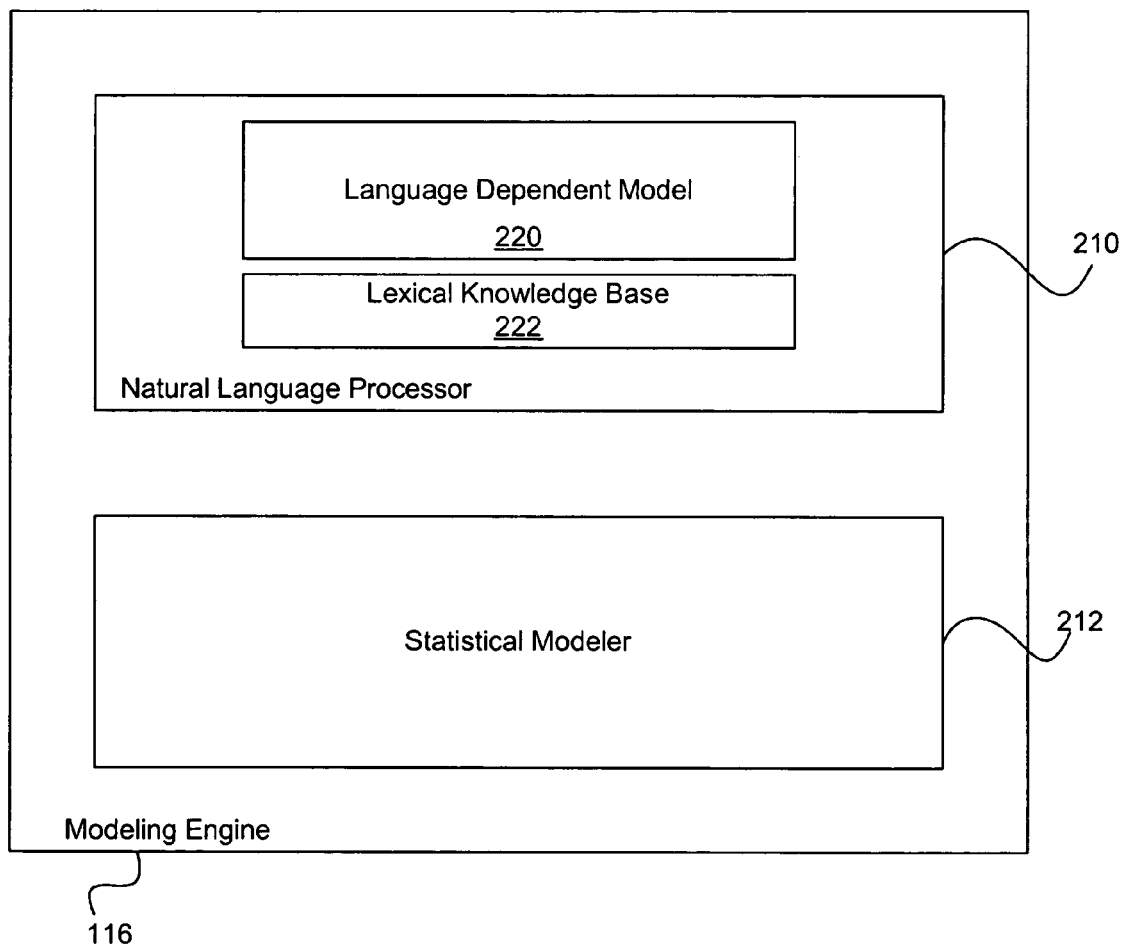
FIG. 2 is a block diagram for one embodiment of the Modeling Engine of FIG. 1, according to the present invention.

Referring now to FIG. 2, a block diagram of modeling engine 116 is shown, according to one embodiment of the present invention. Modeling engine 116 includes, but is not limited to, a natural language processor 210, and a statistical modeler 212. Natural language processor 210 evaluates customer communications in natural language to determine the customer's intent and other relevant information. Data structures such as fixed fields in a web-based form are considered a subset of natural language.

Natural language processor 210 includes, but is not limited to, a language dependent module 220 that extracts information from a natural language communication, and a lexical knowledge base 222 that include lexical, morphological, and semantic information. Natural language processor 210 may identify the language of the communication and have a separate language dependent module 220 and dictionaries for various languages that operate simultaneously. Language dependent module 220 identifies the content-rich parts of the relationship event, and corrects spelling and grammatical errors. In fact, language dependent module 220 expects poor grammar and broken text in relationship events, and does not rely upon accurate grammar to perform sentence analysis, which improves the accuracy of system 100.

Language dependent module 220 performs text analysis using context rules. Some context rules are rigid rules and others are learned statistically from actual texts collected from previous relationship events. Grammar errors and broken text have only a "local" influence on the entire text analysis. Common errors are learned and are referred to as non-rigid rules.

Language dependent module 220 may be modified to parse and understand specific classes of grammatical and syntactic errors that are characteristic of speakers of a particular non-native language. For example, a native German speaker writing in English may connect adjectives together as one word. Language dependent module 220 will recognize this type of error as one commonly made by native German speakers, and correct the error accordingly.

Natural language processor 210 also collects other types of information about a relationship event. This information may include the use of passive voice, semantic information, contextual information, morphological information, and quantitative information. The quantitative information may include the number of sentences or number of exclamation points. Natural language processor 210 identifies key concepts in a relationship event, which are basic components of language information. These components include, but are not limited to, sentences, phrases, words, stems, semantically significant constructs, the type and number of punctuation marks, strong use of the passive voice, dates, and currency amounts.

Natural language processor 210 also identifies the modality of text from any text channel. Natural language processor 210 identifies modes that include, but are not limited to, emotive language, the age or education of the writer, indications of large sums of money, and offensive content. Natural language processor 210 also may identify the type of communication, for example inquiry, request, complaint, formal letter, resume, joke communication, and junk mail.

Natural language processor 210 also includes lexical knowledge base 222. Lexical knowledge base 222 includes lexical, morphological, and semantic domains. The information in lexical knowledge base 222 may be either general or domain dependent. Lexical knowledge base 222 may include, but is not limited to, a lexicon, a thesaurus, a spell checker, a morphological analyzer, and a tagger.

Lexical knowledge base 222 may be constructed off-line using predetermined semantical data, and may accumulate semantical data on-line by monitoring user actions. The semantic domain of lexical knowledge base 222 is the main resource for modeling engine 116 in creating meaningful models.

Natural language processor 210 builds semantic models for relationship events using concepts described in or otherwise suggested by the event and the relationships between the concepts. As a very simple example, the statement "The book is on the table" contains the concepts "book" and "table." A semantic model would include these two concepts and show their relationship of one being "on" the other. Natural language processor 210 also generalizes concepts based on feedback. For example, the statement "the book is on the table" could be generalized to a model that describes a written object on a piece of furniture. Thus, the statement "the newspaper is on the chair" could result in the same generalized model.

The second main component of modeling engine 116 is the statistical modeler 212. Modeler 212 is used in training the system and creating models in conjunction with natural language processor 210. Statistical modeler 212 performs relationship algebra using the models in adaptive knowledge base 118. Relationship algebra compares and modifies models.

For example, model A and model B represent business processes. If model A is compared to model B, a statistical score may be 70%. "Adding" model A with model B produces a new model A' (A+B=A'). If model A' is compared to model B, the statistical score may be 72%. By combining model B with model A, the resulting model A' is a little more like model B. "Subtracting" model B from model A produces another new model A" (A−B=A"). If model A" is compared to model B, the statistical score may be 68%. Thus model A" is a little less like model B. Modeling engine 116 uses these and other types of relationship algebra operations to continuously update models. Feedback determines which operations are performed with the models. System 100 may expect some erroneous feedback, so not every operation necessarily directly affects the models. In some cases, modeling engine 116 will look for supportive evidence before a particular action is incorporated into a model.

Modeling engine 116 maintains internal queues of potential models and potential concepts that are not in actual usage by system 100. Modeling engine 116 continuously checks and updates these potential models and concepts. Modeling engine 116 automatically collects domain knowledge, which is information about the world in which it lives. Modeling engine 116 creates the potential, or hypothetical, models when it sees a pattern of relationship events in the system. Modeling engine 116 tests these hypothetical models and incorporates data into the models when the data is deemed sufficiently accurate.

There are two potential main sources for loss of accuracy of models in a modeling system. The first source is variance, where there is not enough data to support a model. The second source is bias, where there are false beliefs about the data. Modeling engine 116 is capable of distinguishing between these two sources for loss of accuracy, and is able to accurately assess the amount of data that supports each model. Modeling engine 116 may thus decide when the data is sufficiently rich to support predictive use of a model.

Each model in adaptive knowledge base 118 has an internal accuracy gauge that is updated continuously by feedback from the system. Positive feedback increases a model's accuracy rating, and negative feedback decreases the model's accuracy rating. Each model compares its prediction with the actual result or action of the system and responsively modifies its accuracy rating accordingly.

A model's accuracy is rated by recall and precision. A model's recall is the ratio of the number of events the model identified to the number of events the model should have identified. A model's precision is the ratio of the number of events the model identified correctly to the number of events the model identified. Recall and precision may be traded against one another. For example, high recall can be achieved by indiscriminately identifying all events, however this results in loss of precision. Alternatively, high precision can be achieved by identifying events for which the model has high confidence, but some events may be missed and recall would be lower. A good model should have high recall and high precision. Recall and precision measurements may be assessed using feedback from system 100. A statistical matching value between documents and models may also be evaluated by a calculated statistical likelihood value. The likelihood value may be calculated using an adaptive kernel method based on match value results of various categories.

For each branch, adaptive knowledge base 118 gathers statistical data that distinguishes the branch model from its background using significant concepts. Adaptive knowledge base 118 contains two types of data, active concepts and candidate concepts that may become active in the future. Feedback from system 100 is used to update both types of data. Each concept has an associated rate that relates to the difference between its expected contribution in relevant and irrelevant events.

The feedback process modifies the rates of the concepts. Each newly modified rate may determine whether a candidate concept should become active, and whether an active concept should become inactive. The contribution of an active concept to branch classification is based on a log-likelihood-ratio between two statistical models that are built by interpolating the statistical data of the relevant models and the irrelevant models.

If a model's accuracy rating drops below a predetermined threshold, the model is marked as inaccurate and is not used by the system to make decisions. However, the model still receives data and makes predictions, which are compared to the actual performance of the system. The model continues to receive feedback and the accuracy rating continues to be updated. Use of the model will be resumed if and when the model regains an accuracy rating above the predetermined threshold.

When a model is being disregarded, the system may behave according to some predetermined rules, use keywords, or perform some other action like sending relationship events to a queue for processing by a human agent.

As modeling engine 116 learns the business processes of the system, it becomes able to identify erroneous or malicious input by an agent. An agent may make errors that unintentionally damage the accuracy of the system, or may intentionally take incorrect actions to deliberately sabotage the accuracy of the system. Modeling engine 116 can identify responses made by agents that do not fit the patterns predicted by the models. Modeling engine 116 identifies these responses by analyzing feedback that is very different from the system's predictions. Suspicious responses are identified according to the reliability of the origin of the response, and the difference between the system's decision and the feedback. Modeling engine 116 analyzes feedback according to its origin and will trace suspicious feedback, then obtain verification before using the feedback.

There are several ways in which modeling engine 116 may be trained when a system initially goes on-line at an organization. In one embodiment, modeling engine 116 is placed on-line with no active models. The system then receives live relationship events and begins building models. The accuracy of the models' predictions will increase as the number of relationship events increases.

In another embodiment, modeling engine 116 receives historical relationship event data and builds models based on this data. Thus, modeling engine 116 may be placed on-line with models in place that will be fairly accurate if the historical relationship event data is a fair representation of live relationship events.

In a further embodiment, modeling engine 116 is placed on-line with no active models, and the system behaves according to a set of rules or logical expressions. Modeling engine 116 builds models based on live relationship events while the rules are in place. When the models reach an acceptable level of accuracy, the rules are automatically disregarded and the models take over the processing of events. If a model becomes inaccurate, the system may default back to the rules until the model becomes accurate again.

Returning to FIG. 1, one of the application specific modules 140-146 supported by modeling engine 116 is an automatic response module 140. This module automatically composes and sends an appropriate pre-written or "canned" response to a customer communication. Exemplary responses may contain general information about the organization, a request for more information from the customer, or a confirmation that the communication was received. A related response module may compose relevant content-rich responses to customer communications using fragments of existing text and retrieved data, with or without the involvement of human agents. For example, an automatic response concerning a customer's account balance may contain a pre-existing text message with the appropriate amount inserted into the message. An automatic response may also be a combination of multiple fragments identified by modeling engine 116. Modeling engine 116 analyzes the customer's message to identify intents and/or categories. Modeling engine 116 then fetches data, for example an account balance or order status, and a pre-existing text message associated with the appropriate category.

Another module is an expertise based routing module 142 that routes a customer communication to the agent or queue best qualified to perform the required task or solve the customer's problem. Expertise based routing 142 compares a model of the relationship event (e.g., customer facsimile or wireless communication) with models of all available agents or queues to determine which agent is best suited for responding to the event, and then routes the event to that agent or queue. An agent's model may include, but is not limited to, the agent's seniority, automatically detected areas of competency, and languages.

Automatic task prioritization module 141 is another module that is supported by MODELING ENGINE 116. Automatic task prioritization 141 prioritizes tasks and learns from feedback and rules which tasks have a higher priority than others. Priority may be determined based on a service level agreement with the particular customer, dollar amounts mentioned in the communication, the type of information being requested by the customer, or other content of a customer communication. Automatic task prioritization 141 may be customized to make priority decisions according to an organization's specifications.

Modeling engine 116 also may support a content filter module 143 that filters responses composed by agents. Content filter 143 may be used to avoid emotive or rude replies to customers, and as a method for assessing the quality of the responses. Content filter 143 may also be used to ensure compliance with an organization's regulations. In another embodiment, content filter 143 may filter customer communications for emotive or offensive content, and route these communications to a queue for handling by a senior agent.

Business process automation module 145 may be used to complete routine business processes automatically. For example, a transfer of funds between a customer's accounts in a financial institution may be handled automatically, or monthly shipments of a product from a retailer may be processed automatically for customers with standing orders. An automatic business process may be performed using data retrieved from various sources internal to the organization. Thus, a legacy system and a database having different data structures may exchange data via the business process automation module 145 supported by modeling engine 116.

Other modules that may be supported by modeling engine 116 are workflow applications 144, which allow agents to escalate relationship events, reassign events, or add comments to messages. Modeling engine 116 may support other application specific modules 146 that an organization may require, such as automatic fetching of data and/or agents needed to solve a particular problem, building a team of skilled agents according to the needs of a task, suggesting internal recipients for a communication within an organization, and detecting "hot prospects."

Another application specific module 146 may automatically generate relevant Frequently Asked Questions (FAQ) that are responsive to a customer's intent. The module, in conjunction with modeling engine 116, determines the intent or intents of the customer, selects from a general list the most relevant FAQs, and incorporates them into a response sent to the customer. Yet another module may post an automatic response to a relationship event on a website and send a customized URL to the customer so that, among other things, the system can track if and when the response was accessed.

Another application specific module 146 may generally classify communications and documents based on content. Customer communications that may not require a response, for example responses to customer surveys, and other electronic documents, such as directives from management to agents, may be classified by content and automatically stored in an appropriate file or database. For instance, this module may identify extremely negative survey responses and forward them to a queue for further evaluation by management.

Other application specific modules 146 that an organization desires may be built and incorporated into an existing system without taking the system off-line. Thus, each system may be customized to meet the needs of a specific organization and may be updated and modified as the organization's needs change.

Figure 3:
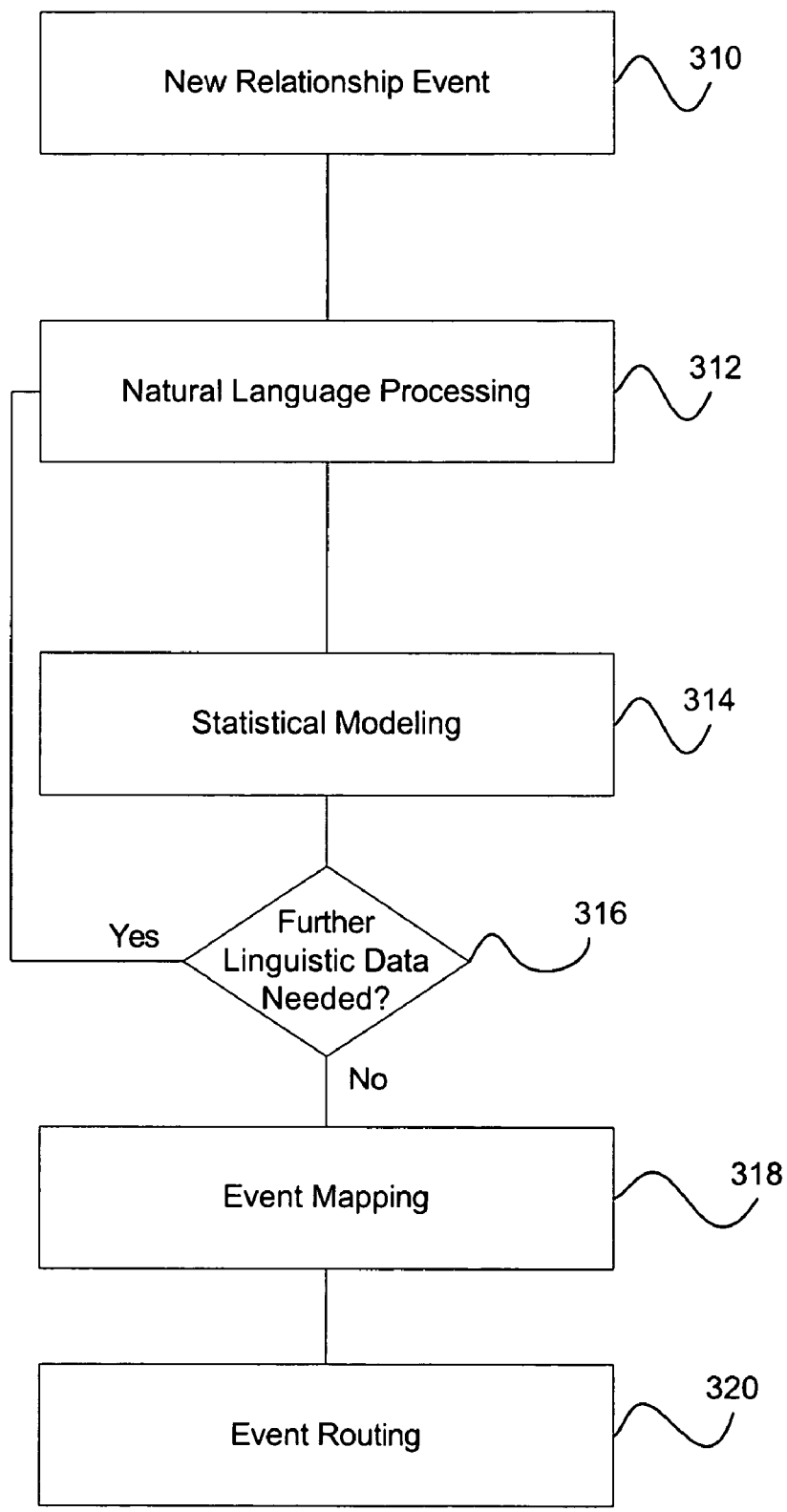
FIG. 3 is a flowchart of method steps for processing relationship events, according to one embodiment of the present invention.

Referring now to FIG. 3, a flowchart of method steps for processing a relationship event is shown, according to one embodiment of the present invention. In the FIG. 3 embodiment, the new relationship event is received via a text-based channel such as email.

In step 310, system 100 receives a new relationship event, which is translated into a universal data model by contact center 112, and is then routed to modeling engine 116. In step 312, the natural language processor 210 analyzes the event to identify concepts, utilizing linguistic data from adaptive knowledge base 118. Natural language processor 210 may perform various analyses on the event, including semantic, contextual, morphological, and quantitative.

Next, in step 314, the concepts are used to build a model for the event using statistical modeling and modeler 212, as discussed above. In step 316, modeler 212 determines whether it needs further linguistic information for the event. If so, the method returns to step 312 for additional natural language processing. If not, the method continues with step 318, where modeling engine 116 maps the event model to all models in adaptive knowledge base 118 to determine the relevancy of the event to each category. The event mapping step assigns a score to every category for each relationship event based on how closely the model for the relationship event corresponds to a category's models. The score is determined by comparing the models using the relationship algebra described above. In other embodiments, logical expressions (rules) are used to categorize events. These rules may also be used when models are considered inaccurate.

Next, in step 320, the event is routed for automatic or semi-automatic action, based on the category scores and configuration settings. An event may be routed to certain queues or agents if the corresponding category score is greater than a predetermined threshold. The user (manager) of system 100 may set these thresholds and vary them at any time to best suit the needs of the organization. Alternatively, the threshold values may be set automatically based on information from the system itself.

Relationship events received via a voice channel are processed slightly differently. Voice events may be initially handled by an agent who determines the customer's intent. The agent is presented with a tree showing topics of various customer intents. The agent chooses an appropriate topic or topics, and the system then fetches data and canned responses corresponding to the selected topic.

Voice events may also be processed by a digital signal processing (DSP) module that categorizes events based on the acoustical content of an audio signal. The module compares a received voice event to models of previous events to predict an appropriate action, including transmitting a pre-recorded vocal response. Voice events may be processed in real time, or may be stored as voice mail messages and processed off-line. In the preferred embodiment, the voice events are not transformed into text before being categorized. Agent feedback may be used to refine the models of acoustical patterns.

Figure 4:
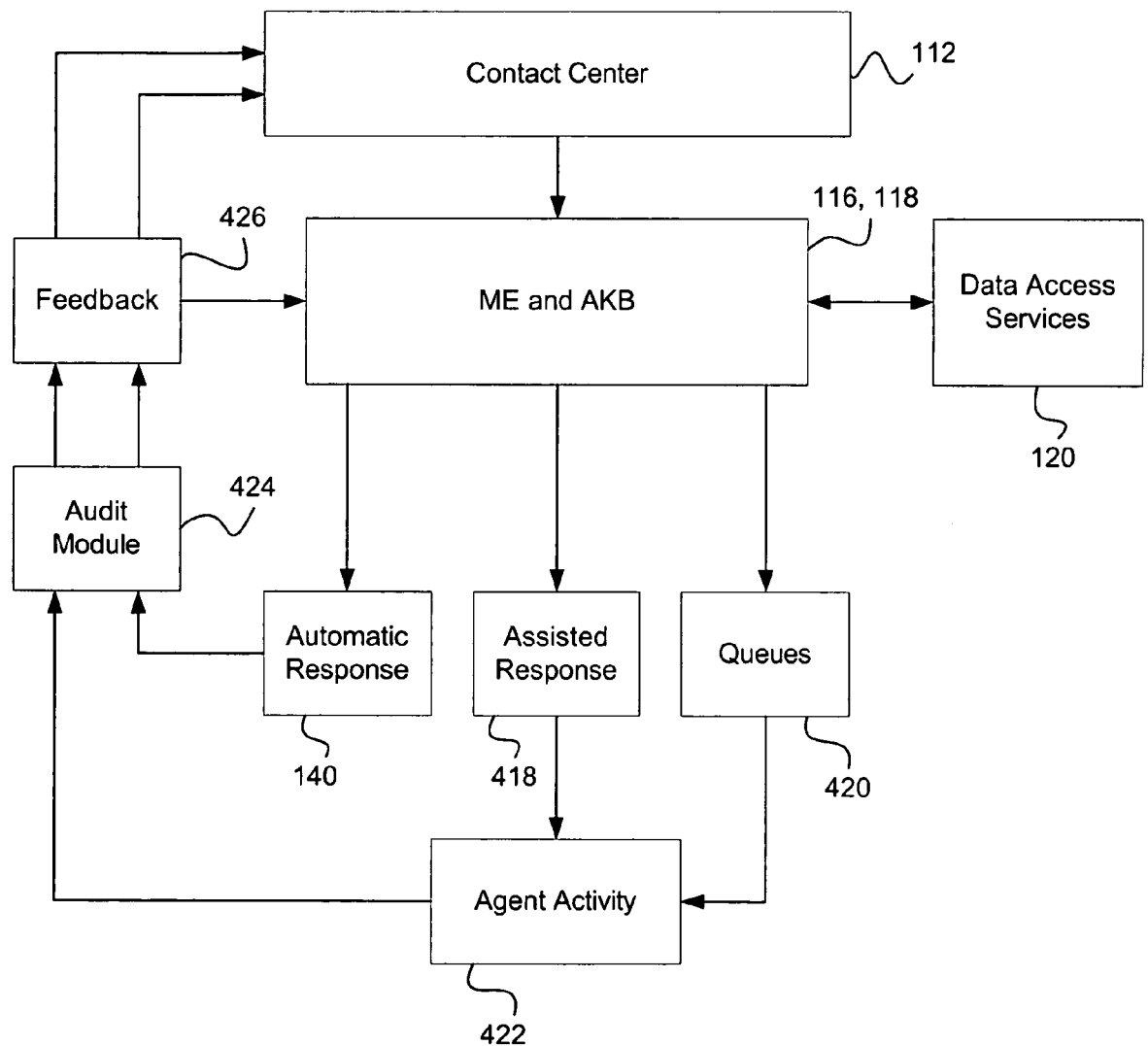
FIG. 4 is a diagram of relationship event processing, according to one embodiment of the present invention.

Referring now to FIG. 4, a diagram of relationship event processing is shown, according to one embodiment of the present invention. A relationship event is received in the contact center 112 and translated into the universal data format. The event is then processed by the modeling engine 116 in conjunction with the adaptive knowledge base 118, as described above in conjunction with FIGS. 2 and 3. Modeling engine 116 accesses any required data from data access services 120 and forwards the event model and data for further processing.

Modeling engine 116 may forward the event model and data to an automatic response module 140, an assisted response module 418, or a queue 420. The present invention may also include other modules, as described above in conjunction with FIG. 1. Modeling engine 116 may forward the event model to as many modules as needed to respond to all of the intents expressed in the event.

The automatic response module 140 generates an appropriate automatic response and forwards the response to an audit module 424. The audit module 424 may or may not perform an audit on the response, as will be described below. If an audit is performed, the result is then forwarded to a feedback module 426, where feedback is sent to modeling engine 116. This feedback from an automatic response will most likely be positive feedback that strengthens the accuracy rating of the model that selected the response. The automatic response is then sent to the contact center 112, where the response is formatted for the appropriate communication channel and sent to the customer. Feedback module 426 supports multiple feedbacks to a single communication.

The assisted response module 418 will forward the event model, the associated information gathered by modeling engine 116 including a history of interactions with the customer, and a list of suggested (canned) responses to the event to an agent 422. The agent 422 may select one or more of the suggested responses, or may compose an original response. The response is forwarded to the audit module 424, which may or may not perform an audit on the response. The response then flows to the feedback module 426, which provides the response feedback to modeling engine 116.

The feedback system of the present invention performs two separate processes: updates the structure of models in adaptive knowledge base 118 and adjusts the models' accuracy ratings. The feedback from feedback module 426 may be positive or negative. If the agent selected one of the suggested responses, the model that predicted that response will be updated and its accuracy rating will increase since its feedback was positive. The models that predicted other responses will also be updated, and their accuracy ratings will decrease since their predictions were not implemented, thus their feedback was negative. If the agent composed an original response, some or all of the models will receive negative feedback.

Relationship events and associated data may be sent to one or more queues 420 by modeling engine 116. Queues may store events of low priority until events of high priority have been processed. Other queues may store events that contain more than one request. For instance, a customer may request information regarding an existing account and express an interest in a new account. The first request may be satisfied with an automatic response, but the second request may be sent to a queue for new accounts. The second request may then be forwarded to an agent who handles new accounts.

The present invention includes built-in quality control based on audits of responses to relationship events. The audit module 424 reviews responses to relationship events and feeds this information back to modeling engine 116 via the feedback module 426. Modeling engine 116 may determine that a particular agent assisted response was inappropriate if the response varies greatly from what was predicted. The system user may configure the audit module 424 to perform audits based on various criteria, including, but not limited to, the experience level of agents, the status of the customer based on a service level agreement, which queue the event was routed to, the channel of the event, the type of response, and whether the agent sent a canned or a composed response.

The learning capabilities of modeling engine 116 allow the system to maintain a high level of recall without sacrificing precision. Recall is a ratio of a number of events correctly selected for automatic response or automatic action to a total number of relationship events that are received by the system. Precision is a ratio of the number of events correctly selected for automatic response or automatic action to the total number of events selected for automatic response or automatic action. In typical systems, when a system is instructed to increase the number of events that will be responded to automatically, the precision of the system decreases noticeably. When recall is increased, the system will select events for automatic response in which the system has lower confidence. This results in a higher potential for errors in selecting appropriate responses, which lowers the system's precision.

In the system of the present invention, modeling engine 116 allows system 100 to automatically respond to a large number of relationship events correctly. Modeling engine 116 quickly learns from feedback which responses are appropriate for various intents, and automatically creates new models as new types of relationship events are received. Thus, system 100 may be instructed to increase the number of events selected for automatic response without causing a significant loss of precision.

Loss of precision usually occurs because the "world" a system lives in is continuously changing. A static rule-based or keyword-based system becomes less accurate over time. In contrast, modeling engine 116 learns and adapts with every relationship event that it sees, thus maintaining a high level of accuracy over time.

Figure 5:
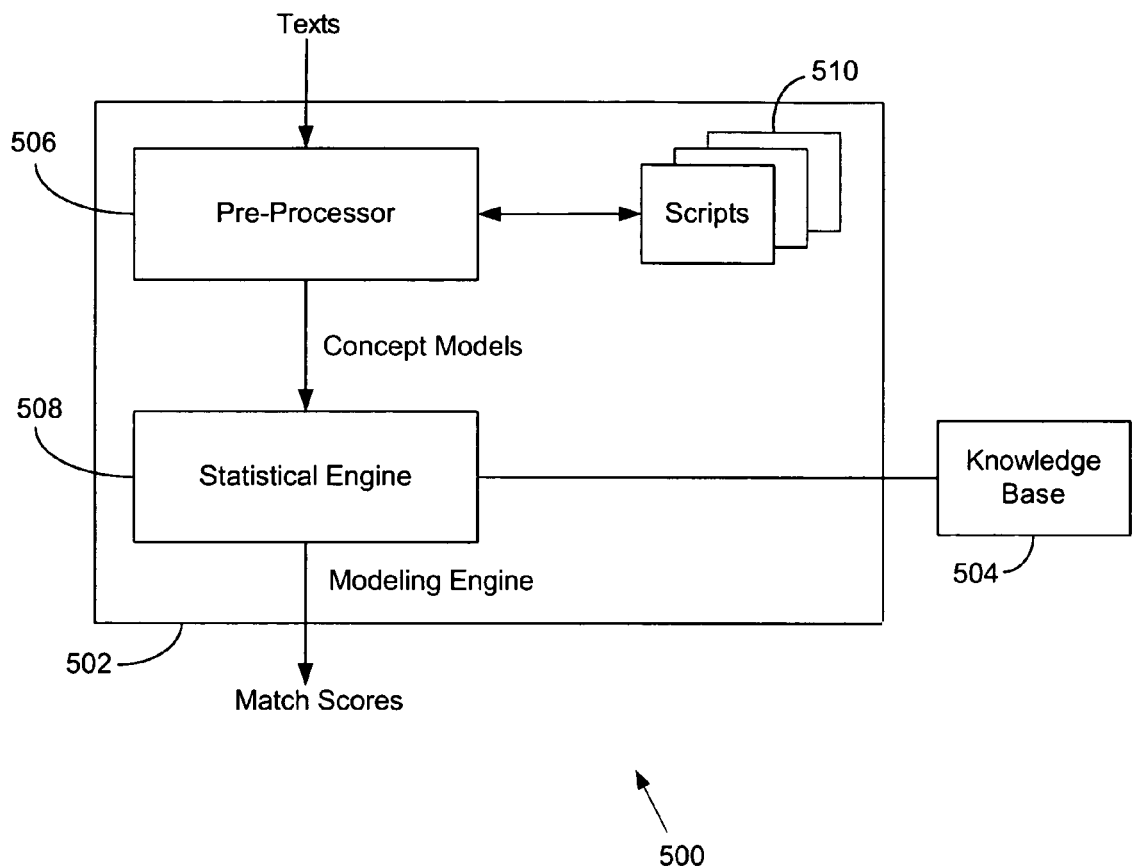
FIG. 5 is a block diagram of another embodiment of the modeling engine and knowledge base.
Figure 6:
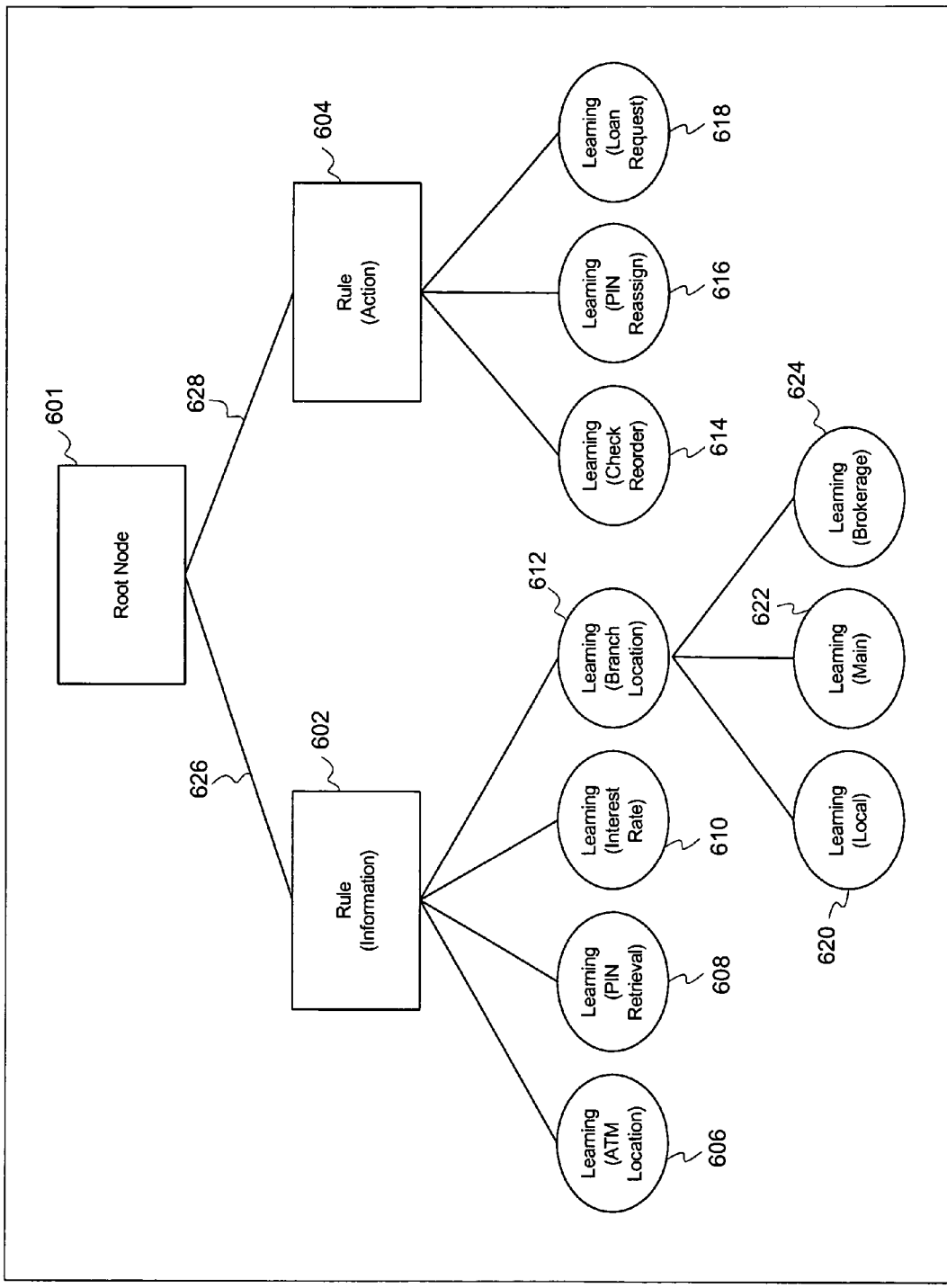
FIG. 6 is a symbolic diagram showing the organization of nodes in an exemplary knowledge base.
Figure 7:
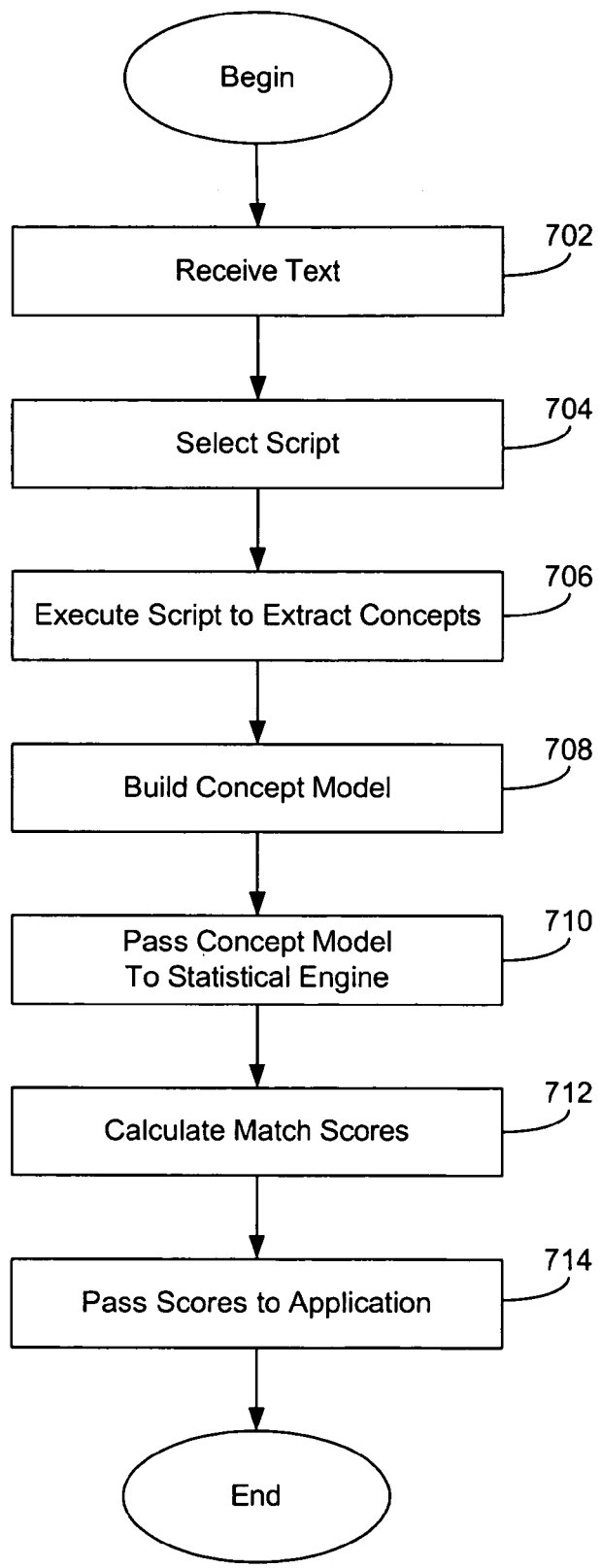
FIG. 7 is a flowchart of method steps for analyzing and classifying a text, in accordance with an embodiment of the invention.

FIGS. 5-7 depict in further detail an embodiment of a text classifier system 500 comprising a modeling engine 502 and a knowledge base 504 that may be utilized to perform analysis and classification of texts. It should be appreciated that the embodiment depicted in these figures may be employed in connection with the contact center 112 of the electronic communication management system 100 as illustrated above in FIG. 1, but should not be construed as being limited to the contact center 112 or other specific applications.

Referring initially to FIG. 5, the modeling engine 502 is arranged to receive texts from an application (e.g., the contact center 112, or channels such as electronic mail 132 or web-based communications 133), and to produce as output a set of match scores representative of the relevance of the texts to individual ones of a plurality of pre-established categories. To perform the classification (i.e., scoring) function, modeling engine 502 utilizes rule-based and statistical information stored in the knowledge base 504. In a preferred implementation of knowledge base 504, feedback is provided to knowledge base 504 on a continuous or periodic basis, and the information contained within knowledge base 504 is adjusted accordingly so as to improve classification performance.

Modeling engine 502 consists of two major components that serially process texts received from the application: a pre-processor 506 and a statistical engine 508. Generally described, pre-processor 506 analyzes a text to extract concepts based upon content and context of the text. Data associated with the text, but not comprising the text (i.e., meta-data), is an illustrative example of the context of the text. Examples of meta-data include, but are not limited to, a URL of a web page through which the text was supplied, a user ID and associated privileges, attributes of the channel through which the text was transmitted (e.g., secured or unsecured), a zip code corresponding to user login location, and demographic information. As discussed above, a concept is a basic unit of linguistic or quantitative information that may have an influence on the classification of the text. The linguistic information may include, for example, semantic, contextual and morphological data. The quantitative information may include, for example, various indicators derived from the text, such as its length. The extracted concepts are assembled into a concept model (a structured text object) and passed to statistical engine 508.

Statistical engine 508 then computes a set of match scores for the text representative of its relevance to one or more of the plurality of pre-established categories. As noted above, the pre-established categories may represent textual content or indicate some other attribute of a text. Statistical engine 508 uses information contained in knowledge base 504 to perform the computations. The match scores are then passed to a match score processing application (e.g., automatic response module 140), which may execute any appropriate action(s) (such as automatically sending one or more suggested responses or a link to a web-based resource, for example) based on the computed match scores. Match score processing is discussed in further detail in patent application Ser. No. 10,839,930, entitled, "A Web-Based Customer Service Interface," herein incorporated by reference, and filed on an even date herewith.

Those skilled in the art will recognize that the various components of modeling engine 502 may be implemented as computer-readable instructions that may be executed on a general-purpose processor. It will also be apparent to those skilled in the art that components of modeling engine 502, as well as knowledge base 504 and other applications that utilize the services of the text classifier system 500, may reside on a single computer or on multiple computers that communicate over a network.

Texts received by pre-processor 506 are organized into fields (also referred to as name-value pairs, or NVPs). Each field identifies a separate component of a text; for example, in a case where the texts take the form of email messages, the fields may consist of a "To" field identifying the address of the recipient, a "From" field identifying the address of the sender, a "Subject" field specifying the subject of the message, and a "Body" field containing the body of the message. Decomposition of the text into component fields may be performed either by the application or by pre-processor 506. Individual fields may include either structured or unstructured data. Structured data consists of data having certain predetermined constraints on its values and/or format, such as a field which can only take a value of TRUE or FALSE. Unstructured data, such as a free language field (for example, the "Body" field described above) does not need to conform to prescribed restraints. Structured data may include metadata, which is data indicative of aspects of the context in which the text was prepared and/or transmitted.

According to a preferred embodiment, pre-processor 506 is configured as an interpreter that selects, loads and executes a script 510 from a plurality of available scripts. Each script 510 contains a unique set of instructions used to identify concepts in the text, and will include instructions for both low-level operations such as locating word boundaries, as well as higher level operations performing stemming of the text or morphological analysis of words. Scripts 510 will typically be language specific (i.e., different scripts will be utilized for analysis of texts in different languages), and individual scripts may also be specific to a particular context in which the text was communicated and/or the type of content of the text. By architecting pre-processor 506 as an interpreter which selects and executes scripts as needed, modeling engine 502 may be more easily adapted for use with texts in multiple languages and/or which arise from multiple scenarios.

In one embodiment of the invention, pre-processor 506 is comprised of standard linguistic and semantic models to extract concepts from the text and to analyze the text for structure, such as identifying capital letters, punctuation, multi-language text, fragments of programming languages, HTML text, or plain text. According to one embodiment of the invention, pre-processor 506 first identifies a language of the text without using a lexicon, and then selects, loads, and executes at least one script associated with the identified language. In another embodiment, the pre-processor 506 comprises a delimiter-specific language parser for parsing text of languages such as Chinese and Japanese that typically comprise sentences with no delimiters (e.g. spaces) between words.

In one embodiment, the pre-processor 506 is governed by a configuration file/object (not shown) and the scripts 510. Although out-of-the-box configurations of pre-processor 506 may exist, a client may customize the configuration file/object and the scripts 510 to tailor concept extraction methods to particular applications. For example, a client may define client-specific (i.e., application-specific) data type fields associated with the configuration file/object. In one embodiment, the configuration file/object includes a Language field, a Linguistic Mode field comprising, but not limited to, Morphology, Stemming, Error Correction, Tokenization, Conceptualization, and Cleaning features, for example, and a Concept Extraction Instructional field.

In operation, the configuration file/object utilizes the data type fields to initially analyze the text for script selection. That is, dependent upon the initial analysis, the pre-processor 506 selects appropriate scripts 510 to continue the analysis of the text, where each data type field calls upon specific scripts 510. For example, the Morphology feature has a series of morph-scripts 510 that define morphological rules to be applied to the text. Other features of the Linguistic Mode field such as Cleaning, Tokenization and Conceptualization use a series of scripts 510 that define execution of these features by stating instructions to be performed. The Concept Extraction Instructional field comprises a sequence of instructions that can be related to specific scripts 510. For example, the instructions may identify a specific language script 510, an action script such as a language specific Tokenization, Cleaning or Conceptualization script 510, and/or properties of specific text data types (e.g., NVP) and text content type formats such as e-email fields, formatted documents fields, and user-defined formats. The extraction of concepts from the text by the pre-processor 506 will be discussed in further detail below in conjunction with FIG. 7.

Execution of script(s) 510 by pre-processor 506 yields a set of concepts, which are assembled into a structured text object referred to as a concept model, which may be implemented in a semantic modeling language (SML). The concept model is then passed to statistical engine 508, which uses information contained in knowledge base 504 to compute a set of match scores representative of the relevance of the text to the pre-established categories.

FIG. 6 depicts an exemplary organization of data within knowledge base 504. Knowledge base 504 may take the form of a collection of nodes organized into a tree structure. As illustrated in FIG. 6, the exemplary knowledge base 504 comprises a three-level tree structure having a root node 601, two rule-based nodes 602-604, and ten learning nodes 606-624 (also known as statistical nodes), although the scope of the present invention covers any number of levels and nodes. In one embodiment of the present invention, the root node 601 is an optional node that serves as a common entry point to the knowledge base 504.

In accordance with an embodiment of the invention, a learning node comprises a learning category (also referred to as a profile, a statistical model, or a pre-established category) built by training the system on example (i.e., learning) texts submitted to the knowledge base 504. For example, learning node 606 comprises a profile entitled "ATM Location," learning node 608 comprises a profile entitled "PIN Retrieval," learning node 612 comprises a profile entitled "Branch Location," and learning node 624 comprises a profile entitled "Brokerage." Learning node 624 is located in a third level of the tree structure and is a sub-node of learning node 612. According to an embodiment of the present invention, a learning node may also comprise a suggested response or an action (e.g., a link to a web resource). Thus, when the text classifier system 500 classifies the text to a pre-established category associated with a learning node, the text classifier system 500 may automatically respond with the suggested response or action associated with the learning node.

In accordance with the present invention, rule-based nodes are preferably non-adaptive (i.e., static) nodes that comprise profiles (also known as pre-established categories) having data exemplifying the profiles and selected upon initialization of the knowledge base 504. A node is static if a node's profile cannot be modified via system feedback, where feedback may be based upon a system user's response to the suggested responses and/or actions, for example. As illustrated in FIG. 6, rule 602 comprises an "Information" profile, and rule 604 comprises an "Action" profile. In one embodiment, the statistical engine 508 utilizes rule-based nodes (e.g., rule-based nodes 602-604) to select a branch (e.g., a branch 626 or a branch 628) of the tree hierarchy to travel for comparing extracted concepts from the text to profiles associated with the learning nodes located in the selected branch. According to the present invention, a knowledge base (such as knowledge base 504) configured with rule-based nodes and learning nodes provide the statistical engine 508 with an efficient method for classifying a text, since a comparison of a conceptual model derived from the text to the profiles of the learning nodes may be performed on only a subset of the nodes of the knowledge base.

In one embodiment of the invention, the text classifier system 500 receives feedback and may modify one or more of the profiles associated with the learning nodes of the knowledge base. The scope of the invention covers a variety of feedback sources. For example, feedback may be user generated or agent generated. A user may provide explicit feedback to the system 500, or implicit feedback based upon the user's response to the suggested responses and/or actions. In addition, based upon the match score processing application (e.g., automatic response module 140), the system 500 may forward the text to a human agent for analysis and response, if for example, the match scores computed by the system 500 do not meet predetermined response threshold levels for an automated response, or if the system 500 recognizes that the user is an important customer deserving of a personal response, or if the system 500 decides that an automated response to the text is not fully satisfied by the available pre-established categories stored in the knowledge base 504. The system 500 may use the feedback in real-time to modify the learning node profiles. In one embodiment of the invention, the profiles comprise lists of profile-related concepts (also referred to as statistical information). For example, the "ATM Location" profile associated with the learning node 606 may comprise a list having such profile-related concepts such as, "where," "nearest," "ATM," and "is." These profile related concepts define the "ATM Location" profile and are used by the statistical engine 508 to classify such text messages as "Where is the nearest ATM location" to the "ATM Location" profile with a high degree of certainty. In other words, the text message "Where is the nearest ATM location" is highly relevant to the "ATM Location" profile. Profile-related concepts associated with the learning nodes 606-624 may be weighted to identify a concept's significance in correctly matching a text to a profile (i.e., to a pre-established category). According to an embodiment of the invention, the system may use the feedback to modify the weights associated with the profile-related concepts, delete profile-related concepts, invent new profile-related concepts, move profile-related concepts between pre-established categories, delete pre-established categories, add new categories, or change the hierarchical structural of the knowledge base 504.

In accordance with the present invention, the text classifier system 500 may comprise multiple knowledge bases. For example, in one embodiment of the invention, the text classifier system 500 uses multiple knowledge bases when classifying texts written in different languages. In another embodiment, the knowledge base 504 comprises multiple rule-based language nodes, configured such that the text classifier system uses the knowledge base 504 to process (i.e., analyze and classify) texts of multiple languages.

In some situations, it may be useful to calibrate the match scores computed by statistical engine 508 to operational parameters such as precision or recall. For example, a user of the text classifier system 500 may wish to calibrate the match scores to precision (also referred to as accuracy). A precision calibrated match score of a text to a certain pre-established category represents a confidence level that the text is correctly classified to the certain pre-established category. For example, suppose a precision calibrated match score of 70 is computed in classifying a text message A to a pre-established category B. The text classifier system 500 is then 70% confident that text message A is correctly classified to the pre-established category B. As an exemplary embodiment of precision calibration according to the present invention, if a user sets a response threshold level at 90, then only those suggested responses associated with pre-established categories having match scores greater than 90 are sent to a user of the text classifier system 500 (e.g., sent to an author of the text message). In this case, the text classifier system 500 is 90% confident that each suggested response is a correct response to the text message.

Alternatively, a user of the text classifier system 500 may wish to calibrate the match scores to recall (also referred to as coverage). Recall calibrated match scores are used in conjunction with a coverage threshold level to determine a percentage of text messages that are responded to automatically. For example, if the match scores are calibrated to the operational parameter of recall, and if the coverage threshold level is 80, then the text classifier system 500 responds automatically to 80% of text messages, and routes 20% of text messages to an agent for further analysis. Based upon the types of text messages and the accuracy of the knowledge base 504 with regard to different types of text messages, the accuracy of the automatic responses may fluctuate. Although calibration of the match scores to recall guarantees the percentage of the text messages responded to automatically, calibration of the match scores to recall does not guarantee a constant accuracy in the suggested responses.

FIG. 7 is a flowchart depicting the steps of a method for classifying texts, in accordance with an embodiment of the invention. In step 702, the modeling engine 502 receives a text from an application. Next, in step 704, the pre-processor 506 selects a script preferably based upon the language of the written text, context in which the text was communicated, and/or the type of content of the text. In step 706, the pre-processor 506 executes the script to extract concepts from the text. In one embodiment of the invention, the pre-processor first tokenizes the text (i.e., breaks the text down into words), and then performs a morphological analysis of the tokenized text. A morphological analysis may include pairings of conjugated verbs identified in the tokenized text to infinitives, or pairings of identified adjectives to adjective bases. For example, the verb "is" is paired to the infinitive "to be," and the adjective "nearest" is paired to the adjective base "near." Next, in step 708, the pre-processor 506 builds a concept model based upon the concepts extracted from the text. In one embodiment of the invention, the concept model comprises a conceptual list generated by the morphological analysis of the text in step 706. The concept model may optionally include meta-data associated with the context of the text communication.

In step 710, the pre-processor 506 sends the concept model to the statistical engine 508 for processing. Next, in step 712, the statistical engine 508 in conjunction with the knowledge base 504 computes a set of match scores to one or more pre-established categories stored in the knowledge base. The match scores represent classification relevancy to the one or more pre-established categories. In step 714, the statistical engine 508 sends the match scores to a match score processing application to determine a type of action to employ in replying to the text. Types of action include sending one or more suggested responses associated with the preestablished categories with match scores exceeding a predetermined response threshold level to the system user, or routing the text to a human agent for further analysis.

The invention has been explained above with reference to a preferred embodiment. Other embodiments will, be apparent to those skilled in the art in light of this disclosure. For example, the present invention may readily be implemented using configurations other than those described in the preferred embodiment above. Additionally, the present invention may effectively be used in conjunction with systems other than the one described above as the preferred embodiment. The present invention, which is limited only by the appended claims, is intended to cover these and other variations upon the preferred embodiment.

What is claimed is:

1. A computerized text classifier system for classifying text on a computer for electronic communication management in a contact center, comprising:

a pre-processor, performed by the computer, configured to analyze text from an electronic communication received from a customer to determine the customer's intent by identifying concepts in the text and building a concept model containing the identified concepts;

a knowledge base, stored in the computer, having a plurality of nodes including a set of learning nodes, each of the learning nodes being provided with statistical information for determining a relevance of the text to a category associated with the node;

a statistical engine, performed by the computer, for calculating a set of match scores for the concept model using the knowledge base, each match score of the set of match scores indicating the relevance of the text to a category associated with a node of the knowledge base, the category including at least one suggested action to be performed in response to the electronic communication, wherein the suggested action is representative of the relevance of the text to the category, and the suggested action includes generating an automatic response to the customer or routing the electronic communication to an agent to generate an assisted response to the customer; and performing, in the computer, the suggested action in response to the electronic communication based on the calculated set of match scores, in order to improve the response of the contact center to the electronic communications received from customers by the contact center.

2. The computerized text classifier system of claim 1, wherein the text includes a plurality of fields, a first subset of the plurality of fields consisting of unstructured data and a second subset of the plurality of fields consisting of structured data.

3. The computerized text classifier system of claim 1, wherein the plurality of nodes further includes a set of rule-based nodes.

4. The computerized text classifier system of claim 1, wherein the plurality of nodes are organized into a tree structure.

5. The computerized text classifier system of claim 1, wherein the match scores are calibrated to values of an operational parameter.

6. The computerized text classifier system of claim 5, wherein the operational parameter is selected from a group consisting of precision and recall.

7. The computerized text classifier system of claim 1, wherein the pre-processor selects a script from a plurality of scripts and executes the selected script to identify concepts.

8. The computerized text classifier system of claim 7, wherein at least two of the plurality of scripts correspond to different languages.

9. The computerized text classifier system of claim 7, wherein the statistical engine is further configured to receive real-time feedback to adapt the statistical information provided to one or more learning nodes of the set of learning nodes.

10. The computerized text classifier system of claim 9, wherein the real-time feedback comprises a response of a human agent to the relevance of the text to associated categories based upon the set of match scores.

11. The computerized text classifier system of claim 9, wherein the real-time feedback comprises a reply to the suggested action, the suggested action comprising the response or a link to a web-resource.

12. The computerized text classifier system of claim 9, wherein the statistical engine is further configured to modify weights associated with the statistical information, in accordance with the received real-time feedback.

13. A system for classifying text on a computer for electronic communication management in a contact center, comprising:
    means for analyzing, in the computer, text from an electronic communication received from a customer to determine the customer's intent by identifying concepts in the text and building a concept model containing the identified concepts;
    means for providing, in the computer, a knowledge base having a plurality of nodes including a set of learning nodes, each of the learning nodes being provided with statistical information for determining a relevance of the text to a category associated with the node;
    means for calculating, in the computer, a set of match scores for the concept model using the knowledge base, each match score of the set of match scores indicating the relevance of the text to a category associated with a node of the knowledge base, the category including at least one suggested action to be performed in response to the electronic communication, wherein the suggested action is representative of the relevance of the text to the category, and the suggested action includes generating an automatic response to the customer or routing the electronic communication to an agent to generate an assisted response to the customer; and
    means for performing, in the computer, the suggested action in response to the electronic communication based on the calculated set of match scores, in order to improve the response of the contact center to the electronic communication received from customers by the contact center.

14. The system for classifying text of claim 13, wherein the text includes a plurality of fields, a first subset of the plurality of fields consisting of unstructured data and a second subset of the plurality of fields consisting of structured data.

15. The system for classifying text of claim 13, wherein the plurality of nodes further includes a set of rule-based nodes.

16. The system for classifying text of claim 13, wherein the plurality of nodes are organized into a tree structure.

17. The system for classifying text of claim 13, wherein the match scores are calibrated to values of an operational parameter.

18. The system for classifying text of claim 17, wherein the operational parameter is selected from a group consisting of precision and recall.

19. The system for classifying text of claim 13, wherein the pre-processor selects a script from a plurality of scripts and executes the selected script to identify concepts.

20. The system for classifying text of claim 19, wherein at least two of the plurality of scripts correspond to different languages.

21. The system for classifying text of claim 19, wherein the statistical engine is further configured to receive real-time feedback to adapt the statistical information provided to one or more learning nodes of the set of learning nodes.

22. The system for classifying text of claim 21, wherein the real-time feedback comprises a response of a human agent to the relevance of the text to associated categories based upon the set of match scores.

23. The system for classifying text of claim 21, wherein the real-time feedback comprises a reply to the suggested action, the suggested action comprising the response or a link to a web-resource.

24. The system for classifying text of claim 21, wherein the statistical engine is further configured to modify weights associated with the statistical information, in accordance with the received real-time feedback.

* * * * *